US009762853B2

(12) United States Patent
Horiuchi et al.

(10) Patent No.: US 9,762,853 B2
(45) Date of Patent: Sep. 12, 2017

(54) TRANSMISSION MANAGEMENT APPARATUS, TRANSMISSION SYSTEM, TRANSMISSION MANAGEMENT METHOD AND RECORDING MEDIUM

(71) Applicants: Takeshi Horiuchi, Tokyo (JP); Takahiro Asai, Kanagawa (JP)

(72) Inventors: Takeshi Horiuchi, Tokyo (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/058,507

(22) Filed: Mar. 2, 2016

(65) Prior Publication Data

US 2016/0269681 A1    Sep. 15, 2016

(30) Foreign Application Priority Data

Mar. 9, 2015   (JP) ................................. 2015-045668

(51) Int. Cl.
*H04N 7/15*      (2006.01)
*H04N 7/14*      (2006.01)
(Continued)

(52) U.S. Cl.
CPC ......... *H04N 7/147* (2013.01); *H04L 12/1827* (2013.01); *H04L 65/1089* (2013.01);
(Continued)

(58) Field of Classification Search
CPC ....................................................... H04N 7/15
See application file for complete search history.

(56) References Cited

U.S. PATENT DOCUMENTS 8,850,230 B2    9/2014 Schnell et al.
8,938,216 B2 *  1/2015 Shaffer ................ H04N 9/8205
                                                    455/412.1
(Continued)

FOREIGN PATENT DOCUMENTS

JP     2008-227577    9/2008
JP        5394399     1/2014
(Continued)

OTHER PUBLICATIONS

Extended European Search Report issued Jun. 2, 2016 in Patent Application No. 16158047.7.

*Primary Examiner* — Creighton Smith
(74) *Attorney, Agent, or Firm* — Oblon, McClelland, Maier & Neustadt, L.L.P.

(57) ABSTRACT

A transmission management apparatus for managing a session performing transmission/reception of content data via a relay apparatus includes a service information management unit configured to manage service management information in which service identification information for identifying service content provided to each of a plurality of transmission terminals, and service content corresponding to the service identification information are stored preliminarily; a service identification information acquisition unit configured to acquire service identification information of each of transmission terminals participating in the session; a service content determination unit configured to determine service content of the session, based on the service identification information acquired by the service identification information acquisition unit and the service management information; and a session control unit configured to report information specifying quality of the content data to be sent, based on the determined service content of the session, to
(Continued)

each of the transmission terminals participating in the session.

12 Claims, 25 Drawing Sheets

(51) Int. Cl.
*H04L 12/18* (2006.01)
*H04L 29/06* (2006.01)

(52) U.S. Cl.
CPC ........ *H04L 65/403* (2013.01); *H04L 65/4015* (2013.01); *H04N 7/15* (2013.01)

(56) References Cited

U.S. PATENT DOCUMENTS

| | | |
|---|---|---|
| 2008/0158339 A1 | 7/2008 | Civanlar et al. |
| 2009/0116563 A1 | 5/2009 | Kawamura et al. |
| 2012/0147127 A1 | 6/2012 | Satterlee et al. |
| 2012/0282961 A1* | 11/2012 | Bienas ............... H04W 24/00 455/507 |
| 2013/0278712 A1* | 10/2013 | Maeda .................. H04L 65/80 348/14.08 |
| 2015/0074233 A1* | 3/2015 | Won ...................... H04L 65/60 709/219 |
| 2015/0092773 A1* | 4/2015 | Watanabe ............. H04B 7/155 370/389 |
| 2015/0279105 A1* | 10/2015 | Hanai ................... G06F 1/1686 345/633 |
| 2015/0381665 A1 | 12/2015 | Horiuchi et al. |
| 2015/0382340 A1* | 12/2015 | Pandey ................ H04W 72/04 455/452.1 |

FOREIGN PATENT DOCUMENTS

| | | |
|---|---|---|
| JP | 2016-012843 | 1/2016 |
| WO | WO 2013/063056 A1 | 5/2013 |

\* cited by examiner

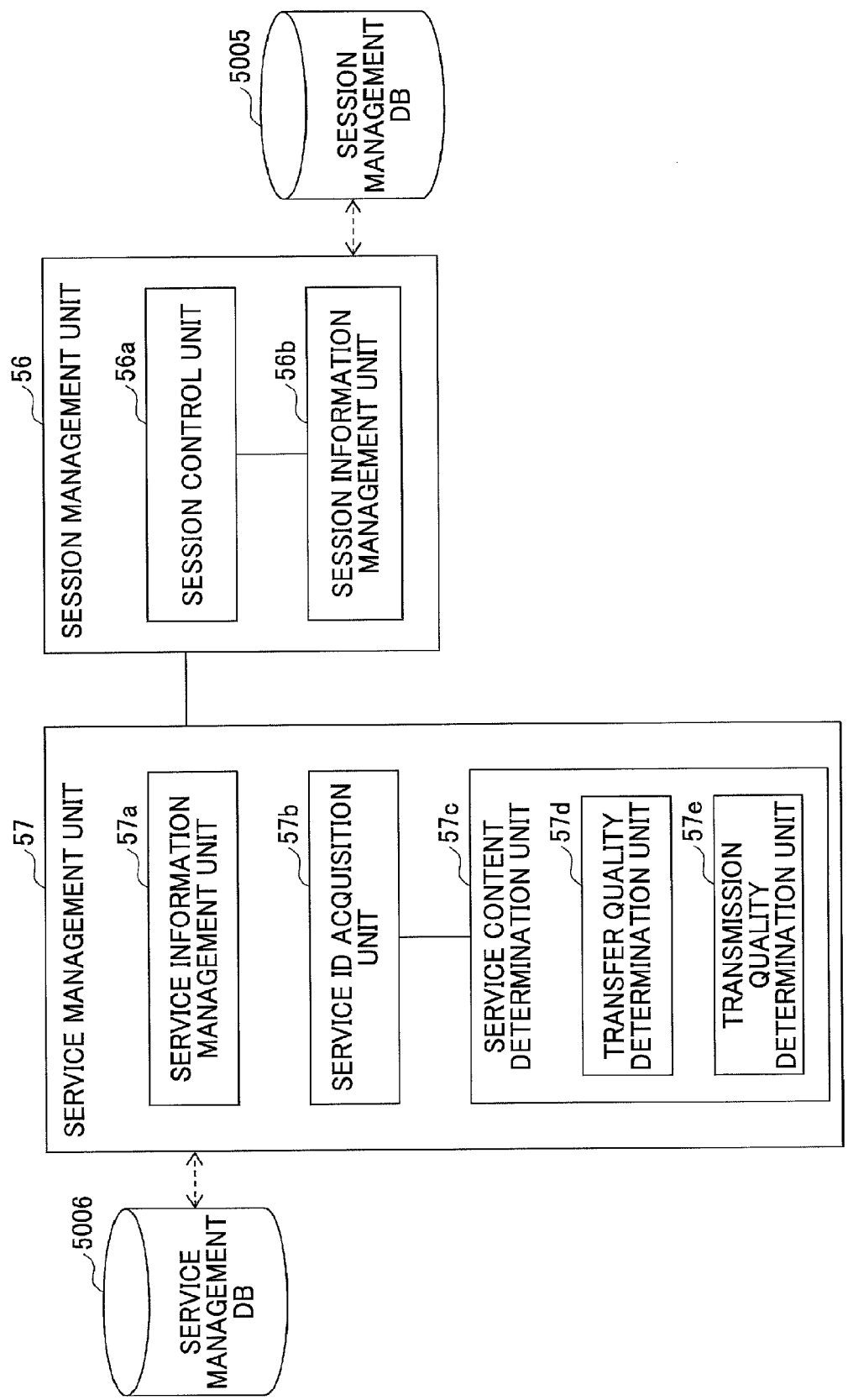

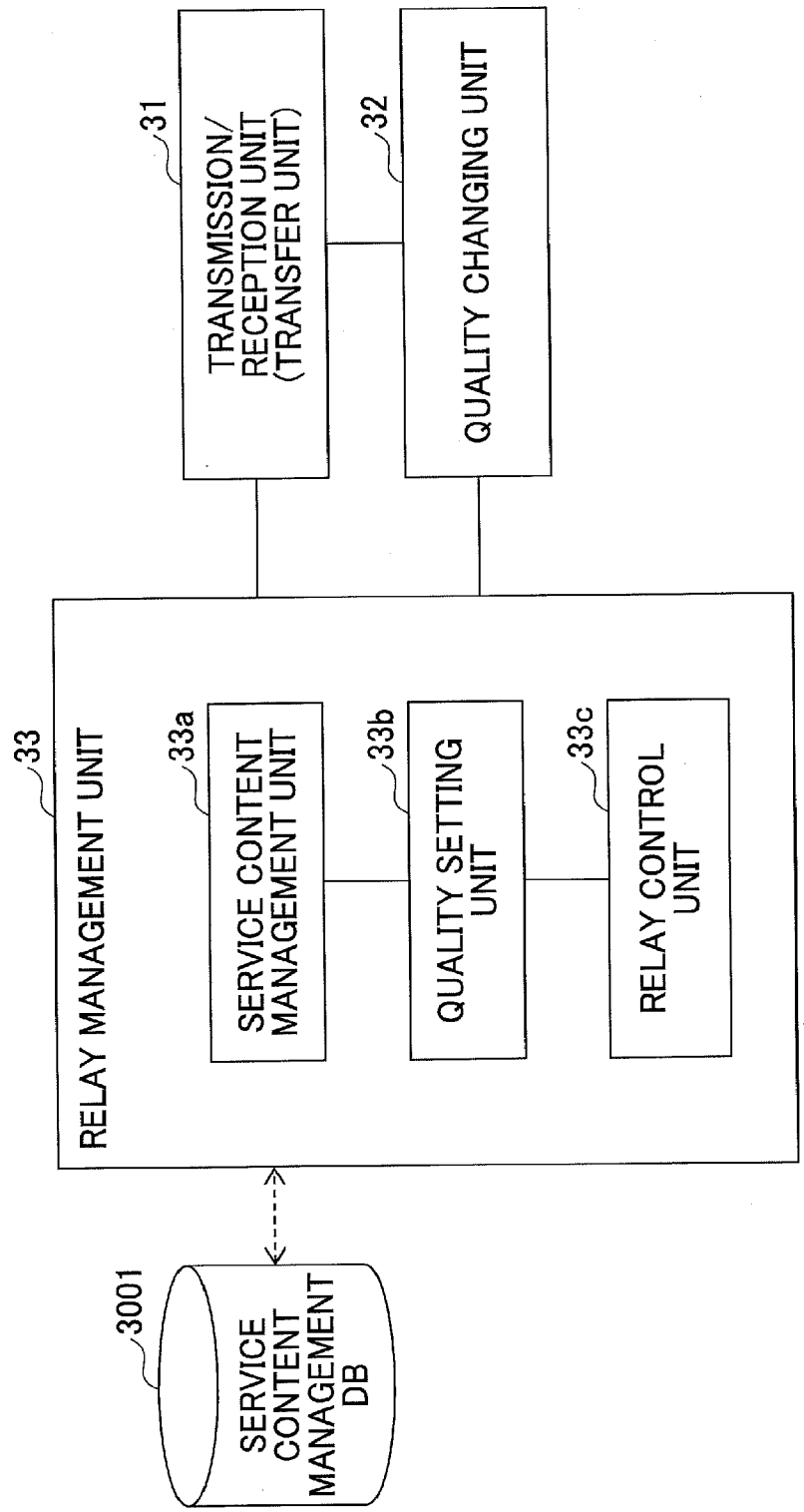

FIG.10A

| RELAY APPARATUS ID | OPERATION STATE | DATE/TIME RECEIVED | IP ADDRESS OF RELAY APPARATUS | MAXIMUM DATA TRANSMISSION RATE (Mbps) |
|---|---|---|---|---|
| 111a | ONLINE | 2014.4.10.13:00 | 1.2.1.2 | 100 |
| 111b | OFFLINE | 2014.4.10.13:10 | 1.2.2.2 | 1000 |
| 111c | ONLINE | 2014.4.10.13:20 | 1.3.1.2 | 100 |
| 111d | ONLINE | 2014.4.10.13:30 | 1.3.2.2 | 10 |

| TERMINAL ID | PASSWORD |
|---|---|
| 01aa | aaaa |
| 01ab | abab |
| 01ba | baba |
| ... | ... |

| TERMINAL ID | DESTINATION NAME | OPERATION STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 2014.4.10.13:40 | 1.2.1.3 |
| 01ab | AB TERMINAL, OSAKA OFFICE, JAPAN | OFFLINE | 2014.4.09.12:00 | 1.2.1.4 |
| ... | ... | ... | ... | ... |
| 01ba | BA TERMINAL, BEIJING OFFICE, CHINA | ONLINE (COMMUNICATION OK) | 2014.4.10.13:45 | 1.2.2.3 |
| 01bb | BB TERMINAL, SHANGHAI OFFICE, CHINA | ONLINE (INTERRUPTED) | 2014.4.10.13:50 | 1.2.2.4 |
| ... | ... | ... | ... | ... |
| 01ca | CA TERMINAL, WASHINGTON D.C. OFFICE, U.S. | OFFLINE | 2014.4.10.12:45 | 1.3.1.3 |
| 01cb | CB TERMINAL, NEW YORK OFFICE, U.S. | ONLINE (COMMUNICATING) | 2014.4.10.13:55 | 1.3.1.4 |
| ... | ... | ... | ... | ... |
| 01da | DA TERMINAL, BERLIN OFFICE, EUROPE | ONLINE (COMMUNICATING) | 2014.4.08.12:45 | 1.3.2.3 |
| 01db | DB TERMINAL, LONDON OFFICE, EUROPE | ONLINE (COMMUNICATION OK) | 2014.4.10.12:45 | 1.3.2.4 |
| ... | ... | ... | ... | ... |

| REQUEST SOURCE TERMINAL ID | DESTINATION TERMINAL ID |
|---|---|
| 01aa | 01ab, 01ba, 01db |
| 01ab | 01aa, 01ca, 01cb |
| 01ba | 01aa, 01ab, 01ca, 01cb, 01da, 01db |
| ... | ... |
| 01db | 01aa, 01ab, 01ba, ..., 01da, 01ca, 01cb, ... |

| SESSION ID | RELAY APPARATUS ID | REQUEST SOURCE TERMINAL ID | DESTINATION TERMINAL ID | DELAY TIME | DELAY INFORMATION DATE/TIME RECEIVED |
|---|---|---|---|---|---|
| se1 | 111a | 01aa | 01bb 01cb 01db | 200 ms | 20xx/11/10 14:00 |
| se2 | 111a | 01ba | 01ca 01cc | 50 ms | 20xx/11/10 14:10 |
| se3 | 111a | 01bb | 01da | 400 ms | 20xx/11/10 14:20 |
| ... | ... | ... | ... | ... | ... |

FIG.11C

| SERVICE ID | IMAGE QUALITY PARAMETER | | SOUND QUALITY PARAMETER |
|---|---|---|---|
| | RECEPTION FRAME RATE | RECEPTION IMAGE QUALITY | RECEPTION SAMPLING RATE |
| sv901 | 30 fps | HD | 44.1 kHz |
| sv902 | 20 fps | HD | 44.1 kHz |
| sv903 | 30 fps | SD | 44.1 kHz |
| sv904 | 20 fps | SD | 44.1 kHz |
| sv905 | 30 fps | HD | 22.05 kHz |
| sv906 | 20 fps | HD | 22.05 kHz |
| sv907 | 30 fps | SD | 22.05 kHz |
| sv908 | 20 fps | SD | 22.05 kHz |
| ... | ... | ... | ... |

| SESSION ID | TERMINAL A | | | TERMINAL B | | | TERMINAL C | | | |
|---|---|---|---|---|---|---|---|---|---|---|
| | TERMINAL ID | RECEPTION IMAGE QUALITY PARAMETER | RECEPTION SOUND QUALITY PARAMETER | TERMINAL ID | RECEPTION IMAGE QUALITY PARAMETER | RECEPTION SOUND QUALITY PARAMETER | TERMINAL ID | RECEPTION IMAGE QUALITY PARAMETER | RECEPTION SOUND QUALITY PARAMETER | |
| se1 | 01aa | 30 fps HD | 44.1 kHz | 01ba | 20 fps HD | 44.1 kHz | 01db | 30 fps SD | 22.05 kHz | ... |
| se2 | 01ab | 20 fps SD | 22.05 kHz | 01ca | 30 fps HD | 44.1 kHz | 01cc | 20 fps HD | 44.1 kHz | ... |
| se3 | 01bb | 20 fps SD | 22.05 kHz | 01da | 10 fps HD | 22.05 kHz | – | – | – | ... |
| ... | | | | | | | | | | ... |

| TERMINAL ID | 01aa | | 01ba | | 01db | | |
|---|---|---|---|---|---|---|---|
| | QUALITY ITEM | QUALITY | QUALITY ITEM | QUALITY | QUALITY ITEM | QUALITY | ... |
| TERMINAL PERFORMANCE | RECEPTION FRAME RATE | 20 fps | RECEPTION FRAME RATE | 20 fps | RECEPTION FRAME RATE | 30 fps | ... |
| | RECEPTION FRAME RATE | 10 fps | RECEPTION IMAGE QUALITY | SD | RECEPTION FRAME RATE | 20 fps | ... |
| | RECEPTION IMAGE QUALITY | SD | SOUND RECEPTION | ALLOWED | RECEPTION IMAGE QUALITY | SD | ... |
| | SOUND RECEPTION | ALLOWED | TRANSMISSION FRAME RATE | 20 fps | RECEPTION IMAGE QUALITY | HD | ... |
| | TRANSMISSION FRAME RATE | 40 fps | TRANSMISSION IMAGE QUALITY | SD | SOUND RECEPTION | ALLOWED | ... |
| | TRANSMISSION FRAME RATE | 20 fps | SOUND TRANSMISSION | ALLOWED | TRANSMISSION FRAME RATE | 30 fps | ... |
| | TRANSMISSION IMAGE QUALITY | HD | | | TRANSMISSION FRAME RATE | 20 fps | ... |
| | SOUND TRANSMISSION | NOT ALLOWED | | | TRANSMISSION IMAGE QUALITY | SD | ... |
| | | | | | TRANSMISSION IMAGE QUALITY | HD | ... |
| | | | | | SOUND TRANSMISSION | ALLOWED | ... |
| | ... | | ... | | ... | | |

| SERVICE ID | TRANS- MISSION FRAME RATE | TRANS- MISSION IMAGE QUALITY | TRANS- MISSION SAMPLING RATE | RECEPTION FRAME RATE | RECEPTION IMAGE QUALITY | RECEPTION SAMPLING RATE |
|---|---|---|---|---|---|---|
| sv901 | GREATER IS PRIORITIZED | GREATER NUMBER OF PIXELS IS PRIORITIZED | SMALLER IS PRIORITIZED | GREATER IS PRIORITIZED | GREATER NUMBER OF PIXELS IS PRIORITIZED | SMALLER IS PRIORITIZED |
| sv902 | SMALLER IS PRIORITIZED | SMALLER NUMBER OF PIXELS IS PRIORITIZED | SMALLER IS PRIORITIZED | SMALLER IS PRIORITIZED | SMALLER NUMBER OF PIXELS IS PRIORITIZED | SMALLER IS PRIORITIZED |
| sv903 | GREATER IS PRIORITIZED | GREATER NUMBER OF PIXELS IS PRIORITIZED | GREATER IS PRIORITIZED | GREATER IS PRIORITIZED | GREATER NUMBER OF PIXELS IS PRIORITIZED | GREATER IS PRIORITIZED |
| ... | ... | ... | ... | ... | ... | ... |

| SERVICE ID | RECEPTION QUALITY ITEM | QUALITY |
|---|---|---|
| sv901 | FRAME RATE | 30 fps |
| | FRAME RATE | 20 fps |
| | IMAGE QUALITY | HD |
| | IMAGE QUALITY | SD |
| | SAMPLING RATE | 44.1 kHz |
| | SAMPLING RATE | 22.05 kHz |
| sv902 | FRAME RATE | 20 fps |
| | FRAME RATE | 10 fps |
| | IMAGE QUALITY | SD |
| | SAMPLING RATE | 22.05 kHz |
| ⋮ | ⋮ | ⋮ |

2101

TRANSMISSION MANAGEMENT APPARATUS, TRANSMISSION SYSTEM, TRANSMISSION MANAGEMENT METHOD AND RECORDING MEDIUM

CROSS-REFERENCE TO RELATED APPLICATIONS

The present application claims benefit of priority under 35 U.S.C. §119 of Japanese Patent Application No. 2015-045668, filed Mar. 9, 2015. The contents of this application are incorporated herein by reference in their entirety.

BACKGROUND OF THE INVENTION

1. Field of the Invention

The disclosures herein generally relate to a transmission management apparatus, a transmission system, a transmission management method and a computer readable recording medium storing a program for causing a computer to execute a process.

2. Description of the Related Art

An example of a transmission system that transmits or receives content data between a plurality of transmission terminals via a relay apparatus includes a videoconference system that carries out a videoconference or the like via a communication network such as the Internet. There is an increasing need for such videoconference systems according to a request for reduction in business trip costs and time in recent years. In such a videoconference system, a plurality of videoconference terminals, which are examples of transmission terminals, are used. A videoconference can be carried out by transmission or reception of image data and sound data among these videoconference terminals (See, for example, Japanese Unexamined Patent Application Publication No. 2008-227577).

In such a transmission system, according to recent improvement of broadband circumstances, it becomes possible to transmit/receive high-quality image data or high-quality sound data. Accordingly, it becomes easier to detect the circumstances of a communication partner in a videoconference, and hence conversation-based communication becomes more productive. However, a communication terminal may be used for different applications or purposes. It is not necessarily preferable that all transmission terminals carry out the transmission of image data or sound data with the setting of high image quality and high sound quality.

For example, in a case of using a transmission terminal for remote medicine, in order to send an image of an affected part of a patient to a remote place, image data are preferably high quality. In contrast, in a case of using a communication terminal for a videoconference system for merely conveying a message or monitoring a video of a monitoring camera with a relatively low image quality, image data are not necessarily of high image quality. In this way, in a case of carrying out data transmission with the setting of high image quality and high sound quality for applications or purposes that do not require high image quality, a communication band of the transmission system may be narrowed, and data transmission of a transmission terminal which requires high image quality, a cost or the like may be affected.

SUMMARY OF THE INVENTION

It is a general object of at least one embodiment of the present invention to provide transmission management apparatus, a transmission system, a transmission management method and a recording medium that substantially obviate one or more problems caused by the limitations and disadvantages of the related art.

In one embodiment, a transmission management apparatus manages a session performing transmission/reception of content data via a relay apparatus. The transmission management apparatus includes a service information management unit configured to manage service management information in which service identification information for identifying service content provided to each of a plurality of transmission terminals and service content corresponding to the service identification information are stored preliminarily; a service identification information acquisition unit configured to acquire service identification information of each of transmission terminals participating in the session; a service content determination unit configured to determine service content of the session, based on the service identification information acquired by the service identification information acquisition unit and the service management information; and a session control unit configured to report information specifying quality of content data to be sent, based on the service content of the session determined by the service content determination unit, to each of the transmission terminals participating in the session.

In another embodiment, a transmission system includes a transmission management apparatus, a relay apparatus, and a plurality of transmission terminals participating in a session performing transmission/reception of content data via the relay apparatus. The transmission management apparatus includes a service information management unit configured to manage service management information in which service identification information for identifying service content provided to each of the plurality of transmission terminals, and service content corresponding to the service identification information are stored preliminarily; a service identification information acquisition unit configured to acquire service identification information of each of transmission terminals participating in the session; a service content determination unit configured to determine service content of the session, based on the service identification information acquired by the service identification information acquisition unit and the service management information; and a session control unit configured to report information specifying quality of the content data to be sent, based on the service content of the session determined by the service content determination unit, to each of the transmission terminals participating in the session. The transmission terminal includes a transmission quality changing unit configured to change quality of content data sent to the relay apparatus, based on the information specifying quality of content data to be sent received from the transmission management apparatus.

In yet another embodiment, a non-transitory computer-readable recording medium stores a program for causing a computer to execute a process of managing a session performing transmission/reception of content data via a relay apparatus. The process includes managing service management information in which service identification information for identifying service content provided to each of a plurality of transmission terminals, and service content corresponding to the service identification information are stored preliminarily; acquiring service identification information of each of transmission terminals participating in the session; determining service content of the session, based on the acquired service identification information and the service management information; and reporting information specifying quality of content data to be sent, based on the determined service content of the session, to each of the transmission terminals participating in the session.

In yet another embodiment, a transmission management method for managing a session performing transmission/reception of content data via a relay apparatus is performed by a transmission management apparatus. The transmission management apparatus manages service management information in which service identification information for identifying service content provided to each of a plurality of transmission terminals and service content corresponding to the service identification information are stored preliminarily. The method includes acquiring service identification information of each of transmission terminals participating in the session; determining service content of the session, based on the acquired service identification information and the service management information; and reporting information specifying quality of content data to be sent, based on the determined service content of the session, to each of the transmission terminals participating in the session.

BRIEF DESCRIPTION OF THE DRAWINGS

Other objects and further features of embodiments will become apparent from the following detailed description when read in conjunction with the accompanying drawings, in which:

FIG. 8 is a configuration diagram illustrating an example of a service management unit and a session management unit according to the first embodiment;

FIG. 9 is a configuration diagram illustrating an example of a relay management unit according to the first embodiment;

FIGS. 10A to 10C are conceptual diagrams illustrating an example of respective management tables managed in a management apparatus according to the first embodiment;

FIGS. 11A to 11C are conceptual diagrams illustrating another example of the respective management tables managed in the management apparatus according to the first embodiment;

FIG. 12 is a conceptual diagram illustrating an example of a service content management table according to the first embodiment;

FIG. 19 is a conceptual diagram illustrating an example of a service priority management table according to the second embodiment;

FIG. 20 is a conceptual diagram illustrating another example of the service priority management table according to the second embodiment;

FIG. 21 is a conceptual diagram illustrating an example of a service management table according to the second embodiment;

DESCRIPTION OF THE PREFERRED EMBODIMENTS

In the following, embodiments of the present invention will be described with reference to the accompanying drawings.

<System Configuration>

Figure 1:
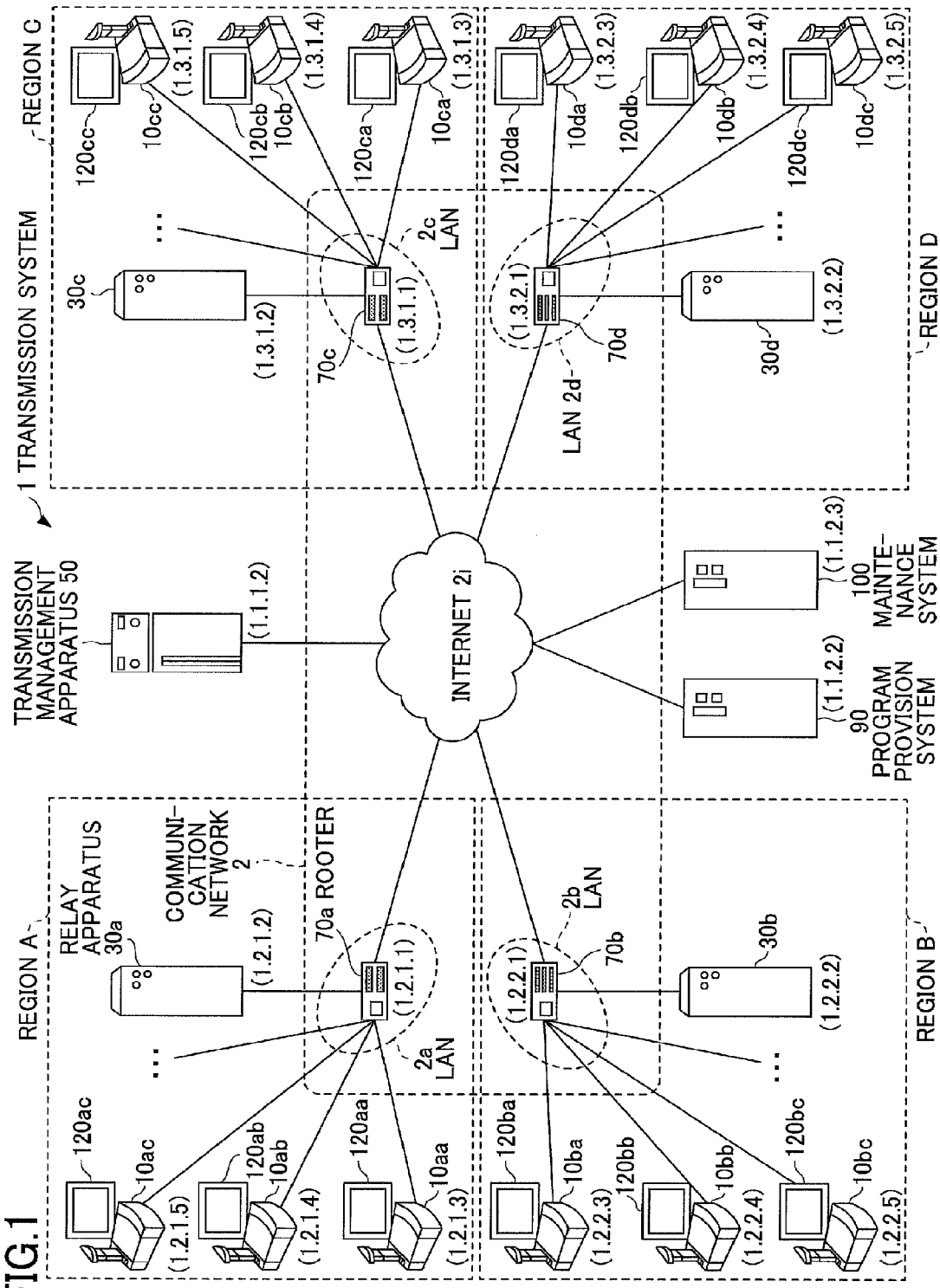
FIG. 1 is a schematic view illustrating an example of a transmission system according to embodiments of the present invention.
Figure 2:
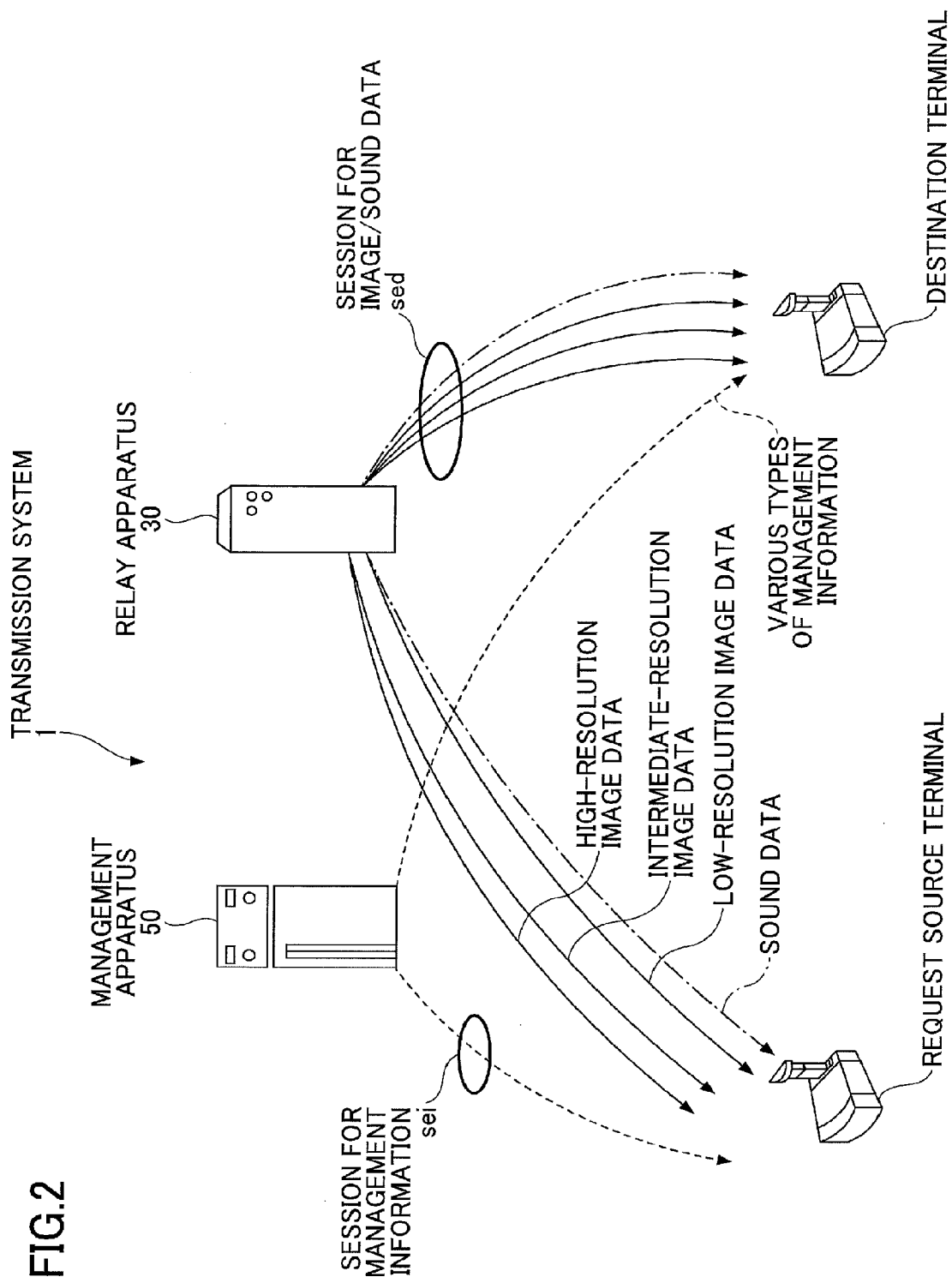
FIG. 2 is a conceptual diagram illustrating an example of a state of transmission or reception of image data, sound data, and various types of management information in the transmission system according to the embodiments.

FIG. 1 is a schematic view of a transmission system according to the embodiments. FIG. 2 is a conceptual diagram illustrating a state of transmission or reception of image data, sound data, and various types of management information in the transmission system. FIGS. 3A to 3C are conceptual diagrams for explaining image quality of image data according to the embodiments.

The transmission system includes a data provision apparatus, which transmits unidirectionally content data from one transmission terminal to the other transmission terminal via a transmission management apparatus, and a communication system, which transfers bidirectionally information, emotion, or the like among a plurality of transmission terminals via a transmission management apparatus. The communication system transfers information, emotion, or the like in two directions among a plurality of communication terminals (corresponding to the "transmission terminals") via a communication management apparatus (corresponding to the "transmission management apparatus"). The communication system is, for example, a video conference system or a video telephone system.

In the embodiments, a video conference system as an example of the communication system, a video conference management system as an example of the communication management system and a video conference terminal as an example of the communication terminal are assumed. Furthermore, a transmission system, a transmission management apparatus and a transmission terminal will be explained. That is, the transmission terminal and the transmission management apparatus according to embodiments of the present invention are applied not only to a video conference system, but also to a communication system or a transmission system.

First, the transmission system 1, as shown in FIG. 1, includes a plurality of terminals (10aa, 10ab, . . . ), display devices for each of the terminals (120aa, 120ab, . . . ), a plurality of relay apparatuses (30a, 30b, 30c, and 30d), a transfer management apparatus 50, a program provision apparatus 90, a maintenance apparatus 100 and the like. Moreover, the terminals (10aa, 10ab, . . . ) perform transmission by sending/receiving image data and sound data as an example of content data.

In the following, a "transmission terminal" will be simply denoted as a "terminal", and a "transmission management apparatus" will be simply denoted as a "management apparatus". Moreover, an arbitrary terminal of the terminals (10aa, 10ab, . . . ) is denoted as a "terminal 10". An arbitrary display device of the display devices (120aa, 120ab . . . ) is denoted as a "display device 120". An arbitrary relay apparatus of the relay apparatuses (30a, 30b, 30c, and 30d) is denoted as a "relay apparatus 30". Furthermore, a terminal as a request source, which has required starting the video conference, is denoted as a "request source terminal". A terminal, which is a destination of the request (destination of the relay), is denoted as a "destination terminal".

Moreover, as shown in FIG. 2, in the transmission system 1, between the request source terminal and the destination terminal, a session for management information "sei" in order to send/receive various types of management information is established via the management apparatus 50. Moreover, between the request source terminal and the destination terminal, four sessions in order to send/receive four data sets, i.e. image data in high resolution, image data in intermediate resolution, image data in low resolution and voice data, are established via the relay apparatus 30. In the present exemplary embodiment, the four sessions are collectively denoted as a session for image/voice data "sed". Meanwhile, the session for image/voice data "sed" is not necessarily four sessions, but the number of sessions may be greater than or less than four.

Next, a resolution of an image of image data processed in the embodiments will be explained. In the embodiments, as shown in FIG. 3A, an image, as a base image, including 160 pixels in the horizontal direction and 120 pixels in the vertical direction will be called a low-resolution image. Moreover, as shown in FIG. 3B, an image including 320 pixels in the horizontal direction and 240 pixels in the vertical direction will be called an intermediate-resolution image. Furthermore, as shown in FIG. 3C, an image including 640 pixels in the horizontal direction and 480 pixels in the vertical direction will be called as a high-resolution image.

Among them, in a case of transmitting through a narrow band path (communication path having a narrow transmission bandwidth), image data of low image quality including only low-resolution image data, as a base image, are relayed. Moreover, in a case where the bandwidth is relatively wide, image data of intermediate image quality including low-resolution image data, as a base image, and intermediate-resolution image data are relayed. Furthermore, in a case where the bandwidth is quite wide, image data of high image quality including low-resolution image data as a base image, intermediate-resolution image data and high-resolution image data are relayed.

The relay apparatus 30, shown in FIG. 1, relays content data between the terminals 10. The management apparatus 50 manages in an integrated fashion a login authentication process from the terminal 10, a status of speech of the terminal 10, the destination list, a status of the communication of the relay apparatus 30, or the like. Moreover, an image of the image data may be a moving picture, a still image, or both a moving picture and a still image.

A plurality of routers (70a, 70b, 70c, 70d, 70ab and 70cd) select an optimal path to transmit the image data and voice data. In the following, an arbitrary router of the routers (70a, 70b, 70c, 70d, 70ab and 70cd) is denoted as a "router 70".

The program provision apparatus 90 is equipped with a hard disk (HD) 204, which will be explained later, and stores a program for the terminal, which enables various functions for the terminal 10, or makes the terminal 10 function as various means. The program provision apparatus 90 sends to the terminal 10 the program for the terminal 10.

Moreover, in the HD 204 of the program provision apparatus 90, a program for the relay apparatus, which enables various functions for the relay apparatus 30, or makes the relay apparatus 30 function as various means, is also stored. The program provision apparatus 90 sends to the relay apparatus 30 the program for the relay apparatus 30. Furthermore, in the HD 204 of the program provision apparatus 90, a program for the transmission management, which enables various functions for the management apparatus 50, or makes the management apparatus 50 function as various means, is also stored. The program provision apparatus 90 sends to the management apparatus 50 the program for the transmission management.

The maintenance apparatus 100 is a computer which maintains, manages or maintains at least one of the terminal 10, the relay apparatus 30, the management apparatus 50 and the program provision apparatus 90. For example, assume that the maintenance apparatus 100 is installed in one country and the terminal 10, the relay apparatus 30, the management apparatus 50 or the program provision apparatus 90 is installed out of the country. In this case, the maintenance apparatus 100 performs the maintenance processing of keeping, managing, maintaining, or the like, for at least one of the terminal 10, the relay apparatus 30, the management apparatus 50 and the program provision apparatus 90, remotely via the communication network 2. Moreover, the maintenance apparatus 100 performs maintenance processing of managing a model number, a production number, a sale destination, maintenance and inspection, a failure history or the like, for at least one of the terminal 10, the relay apparatus 30, the management apparatus 50, and the program provision apparatus 90, without using the communication network 2.

The terminals (10aa, 10ab, 10ac, . . . ), the relay apparatus 30a, and the router 70a are connected via a LAN (local area network) 2a so as to communicate with each other. The terminals (10ba, 10bb, 10bc, . . . ), the relay apparatus 30b, and the router 70b are connected via a LAN 2b so as to communicate with each other. Moreover, the LAN 2a and the LAN 2b are connected via a dedicated line 2ab including a router 70ab so as to communicate with each other, and built in a predetermined region "A". For example, the region "A" is Japan, and the LAN 2a is built in an office in Tokyo. Moreover, the region "B" is China, and the LAN 2b is built in an office in China.

On the other hand, the terminals (10ca, 10cb, 10cc, . . . ), the relay apparatus 30c, and the router 70c are connected via a LAN 2c so as to communicate with each other. The terminals (10da, 10db, 10dc, . . . ), the relay apparatus 30d, and the router 70d are connected via a LAN 2d so as to communicate with each other. Moreover, the LAN 2c and the LAN 2d are connected via a dedicated line 2cd including a router 70cd so as to communicate with each other, and built in a predetermined region "B". For example, the region "C" is the United States of America, and the LAN 2c is built in an office in U.S. Moreover, the region "D" is Europe, and the LAN 2d is built in an office in Europe. The respective routers (70a, 70b, 70c and 70d) are connected via the Internet 2i so as to communicate with each other.

Moreover, the management apparatus 50 and the program provision apparatus 90 are connected to the terminals 10 and the relay apparatuses 30 via the Internet 2i. The management apparatus 50 and the program provision apparatus 90 may be installed in the region "A", in the region "B", in the region "C" or in the region "D", or may be installed outside these regions.

Meanwhile, the communication network 2, according to the embodiments, includes the LAN 2a, the LAN 2b, the Internet 2i, the LAN 2c and the LAN 2d. The communication network 2 may include a section where wireless communications, such as Wi-Fi (Wireless Fidelity, registered trademark) or Bluetooth (registered trademark), not only wired communications, are performed.

Moreover, a combination of four integers, indicated below each of the terminals 10, the relay apparatuses 30, the management apparatus 50, the routers 70, and the program provision apparatus 90 in FIG. 1, represents an IP (Internet protocol) address in a simple form of IPv4. For example, the IP address of the terminal 10aa is "1.2.1.3". Moreover, IPv6 may be adopted instead of the IPv4, but the IPv4 is employed for simplicity in the present exemplary embodiment.

Meanwhile, each of the terminals 10 may be used not only for communication between different offices or between different rooms in the same office, but also for communication in the same room, between indoor and outdoor, or both outdoors. In a case where the terminal 10 is used outdoors, public wireless communication, such as using a mobile phone communication network or a public wireless LAN, is performed.

<Hardware Configuration>

Next, a hardware configuration in the embodiments will be described.

(External View of Terminal)

Figure 4:
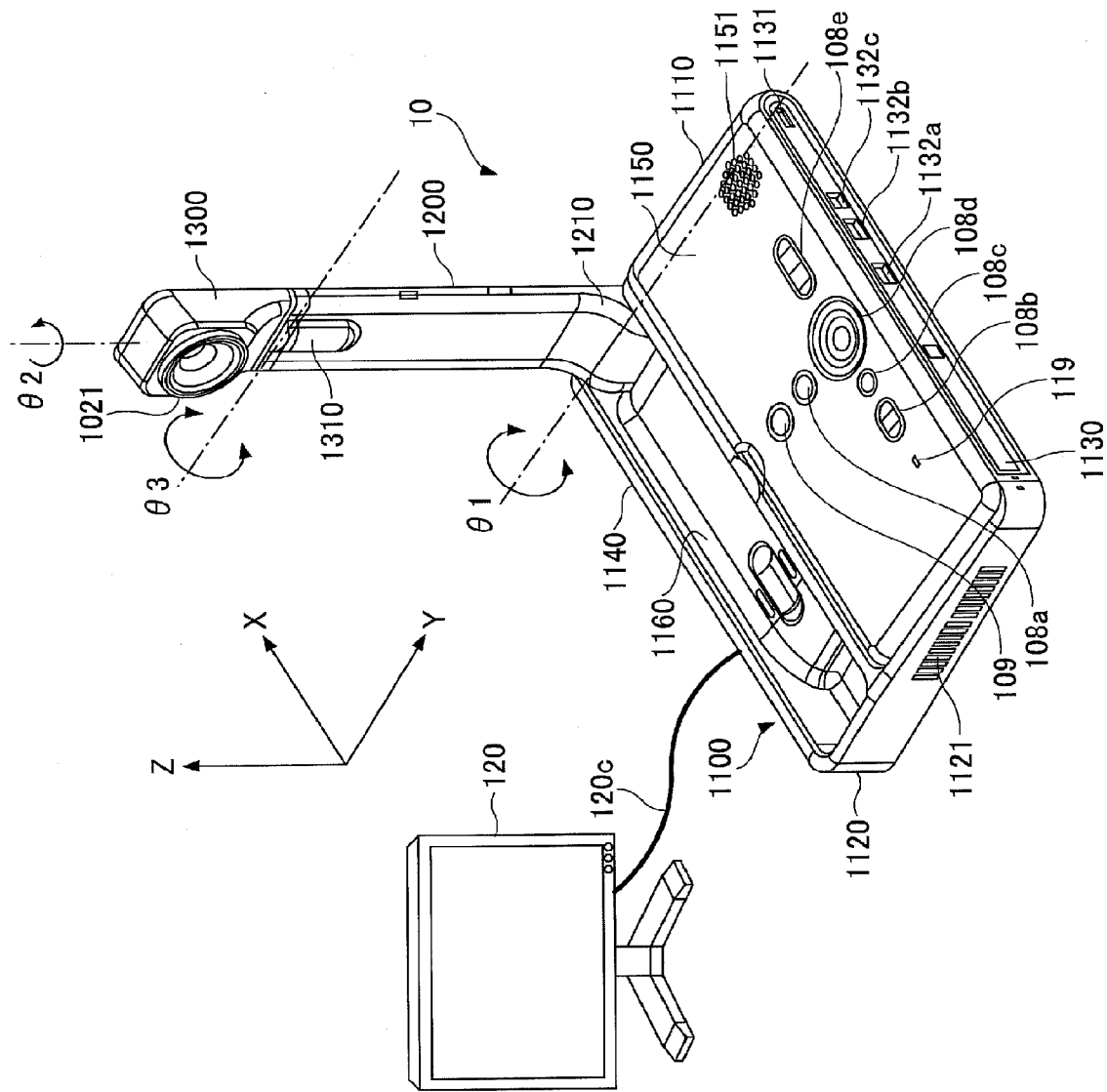
FIG. 4 is an external view illustrating an example of a terminal according to the embodiments.

FIG. 4 is an external view illustrating the terminal 10 according to the embodiments. As shown in FIG. 4, the terminal 10 includes a chassis 1100, an arm 1200 and a camera housing 1300. On a front side wall surface 1110 of the chassis 1100, an intake surface (not shown) in which a plurality of intake holes are formed is provided, and on a rear side wall surface 1120 of the chassis 1100, an exhaust surface 1121 in which a plurality of exhaust holes are formed is provided. According to the above configuration, by driving a cooling fan embedded in the chassis 1100, outside air in front of the terminal 10 can be taken in via the intake surface provided on the front side wall surface 1110 of the chassis 1100, and exhausted behind of the terminal 10 via the exhaust surface 1121. On a right side wall surface 1130 of the chassis 1100, a sound pickup hole 1131 is formed, and sound such as voice sound, noise or the like can be picked up by a built-in microphone 114, which will be described later.

On the side of the right side wall surface 1130 of the chassis 1100, an operation panel 1150 is formed. The operation panel 1150 is provided with a plurality of operation buttons (108a to 108e), which will be described later, a power switch 109, which will be described later, and an alarm lamp 119, which will be described later. Furthermore, on the operation panel 1150, a sound output surface 1151, in which a plurality of sound output holes are formed for passing output sound from a built-in speaker 115, which will be described later, is formed.

Moreover, on the side of the left side wall surface 1140 of the chassis 1100, there is a storage part 1160, which is a recessed part, for storing the arm 1200 and the camera housing 1300. On the right side wall surface of the chassis 1100, a plurality of connection ports (1132a to 1132c) for connecting electrically a cable to an external device I/F 118, which will be described later, are provided. On the other hand, on a left side wall surface 1140 of the chassis 1100, a connection port (not shown) for connecting electrically a cable 120c for the display device 120 to the external device I/F 118, which will be described later, is provided.

Meanwhile, in the following, in a case of indicating an arbitrary operation button of the operation buttons (108a to 108e), "operation button 108" is used, and in a case of indicating an arbitrary connection port of the connection ports (1132a to 1132c), "connection port 1132" is used for explanation.

Next, the arm 1200 is mounted on the chassis 1100 via a torque hinge 1210. The arm 1200 is configured so that the arm 1200 is rotatable vertically where a tilt angle $\theta 1$ with respect to the chassis 1100 is within a range of 135 degrees. FIG. 4 illustrates the state where the tilt angle $\theta 1$ is 90 degrees. The camera housing 1300 is provided with a built-in camera 112, which will be described later. The built-in camera images a user, a paper document, a room or the like. Moreover, a torque hinge 1310 is formed on the camera housing 1300. The camera housing 1300 is mounted on the arm 1200 via the torque hinge 1310. The camera housing 1300 is rotatable vertically and horizontally where a pan angle $\theta 2$ with respect to the arm 1200 is within a range of ±180 degrees (FIG. 4 shows the state of 0 degrees), and a tilt angle $\theta 3$ is within a range of ±45 degrees.

Meanwhile, the above-described external view of FIG. 4 is an example. The present invention is not limited to this external view. The terminal 10 may be a general-purpose PC, a smartphone, a tablet type terminal or the like. The camera and the microphone are not necessarily built-in type, but may be external types. Moreover, since the management apparatus 50 has the same external view as a typical server computer, an explanation of the external view will be omitted.

(Hardware Configuration of Terminal)

Figure 5:
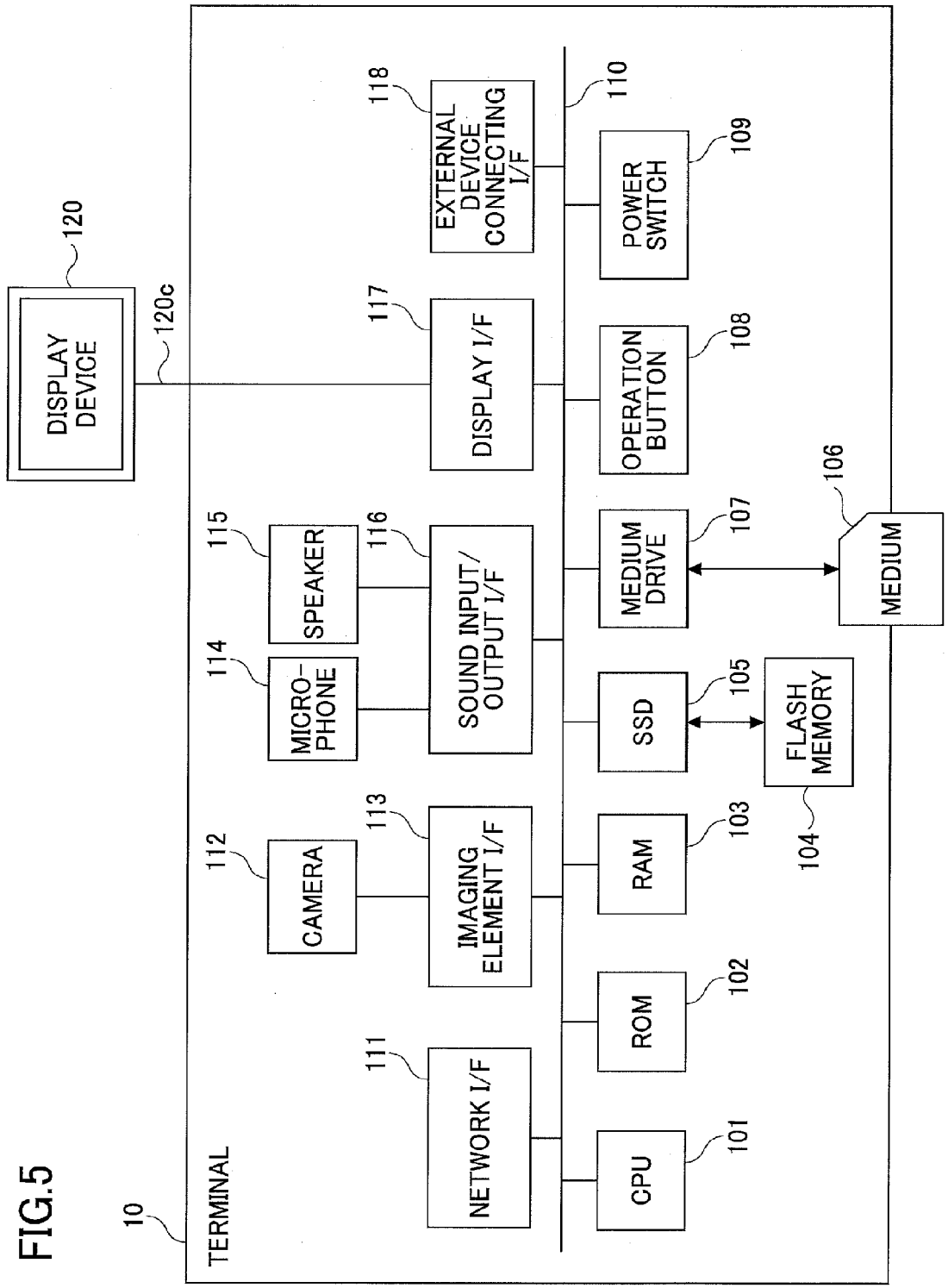
FIG. 5 is a hardware configuration diagram illustrating an example of the terminal according to the embodiments.

FIG. 5 is a diagram illustrating a hardware configuration of the terminal 10 according to the embodiments. The terminal 10 includes configurations of a generic computer, for example, a CPU (central processing unit) 101; a ROM (read-only memory) 102; a RAM (random access memory) 103; a flash memory 104; and an SSD (solid state drive) 105. The terminal 10 further includes a medium drive 107; an operation button 108; a power switch 109; a network I/F (interface) 111; a camera 112; an imaging element I/F 113; a microphone 114; a speaker 115; a sound input/output I/F 116. The terminal 10 further includes a display I/F 117; an external device I/F 118; a bus 110 and the like.

The CPU 101 is, for example, a processing unit that reads out a program or data from the ROM 102, the flash memory 104 or the like and performs a process, to enable respective functions, with which the terminal 10 is provided. The ROM 102 is a non-volatile memory that stores in advance a program or the like used for starting the CPU 101, such as an initial program loader (IPL). The RAM 103 is a volatile memory that is used as a work area or the like for the CPU 101.

The flash memory 104 is, for example, a storage device that stores an operating system (OS), application programs, various types of data and the like. The SSD 105 controls reading/writing various types of data from/to the flash memory 104 under control of the CPU 101. The medium drive 107 controls, for example, reading/writing (storage) data from/to a recording medium 106, such a memory card.

The operation button 108 is an input device that accepts an input operation by a user of the terminal 10. The power switch 109 is a switch for turning ON/OFF a power of the terminal 10. The network I/F 111 is a communication interface for performing data transmission by using the communication network 2.

The camera 112 includes an imaging element for capturing an image of a subject under control of the CPU 101. The imaging element I/F 113 controls capturing by the camera 112 and converts captured data into predetermined image data. The microphone 114 converts picked up sound into an electric signal. The speaker 115 converts a voice signal into voice and outputs the voice. The sound input/output I/F 116 controls input/output of voice by the microphone and the speaker 115.

The display I/F 117 transmits image data to an external display device 120 under the control of the CPU 101. The external device I/F 118 is an interface for connecting various types of external devices. The bus 110 is commonly coupled to the above-described elements, and transmits an address signal, a data signal, various types of control signals, and the like.

The display device 120 includes a liquid crystal display device (LCD), an organic electroluminescence (EL) display device, or the like, and displays an image of a subject, an icon for operation, or the like. Moreover, the display device 120 is coupled to the display I/F 117 by the cable 120c. The cable 120c may be an analog red green blue (RGB) (video graphic array (VGA)) signal cable, a component video cable, a high-definition multimedia interface (HDMI(trademark registered)) signal cable, or a digital video interactive (DVI) signal cable.

The camera 112 includes a lens and a solid-state imaging element that converts light into electric charges to digitize an image (video) of a subject. As the solid-state imaging element, for example, a complementary metal-oxide-semiconductor (CMOS) or a charge-coupled device (CCD) is used.

The external device I/F 118 is capable of connecting external devices such as an external camera, an external microphone and an external speaker, respectively, by using a Universal Serial Bus (USB) cable or the like. In a case where an external camera is connected, the external camera is driven in preference to the built-in camera 112 under control of the CPU 101. Similarly, in a case where an external microphone is connected or an external speaker is connected, the external microphone or the external speaker is driven in preference to the built-in microphone 114 or the built-in speaker 115 under control of the CPU 101.

Meanwhile, the recording medium 106 is, for example, a recording medium such as various types of memory cards or a subscriber identity module (SIM) card. The recording medium 106 is detachable from the terminal 10.

Furthermore, the above-described program for the terminal 10 may be distributed as a file in an installable form or in an executable form stored in a recording medium readable by a computer such as the recording medium 106. Moreover, the above-described program for the terminal 10 may be, for example, stored in the flash memory 104, preliminarily stored in the ROM 102 or the like.

(Hardware Configuration of Management Apparatus)

Figure 6:
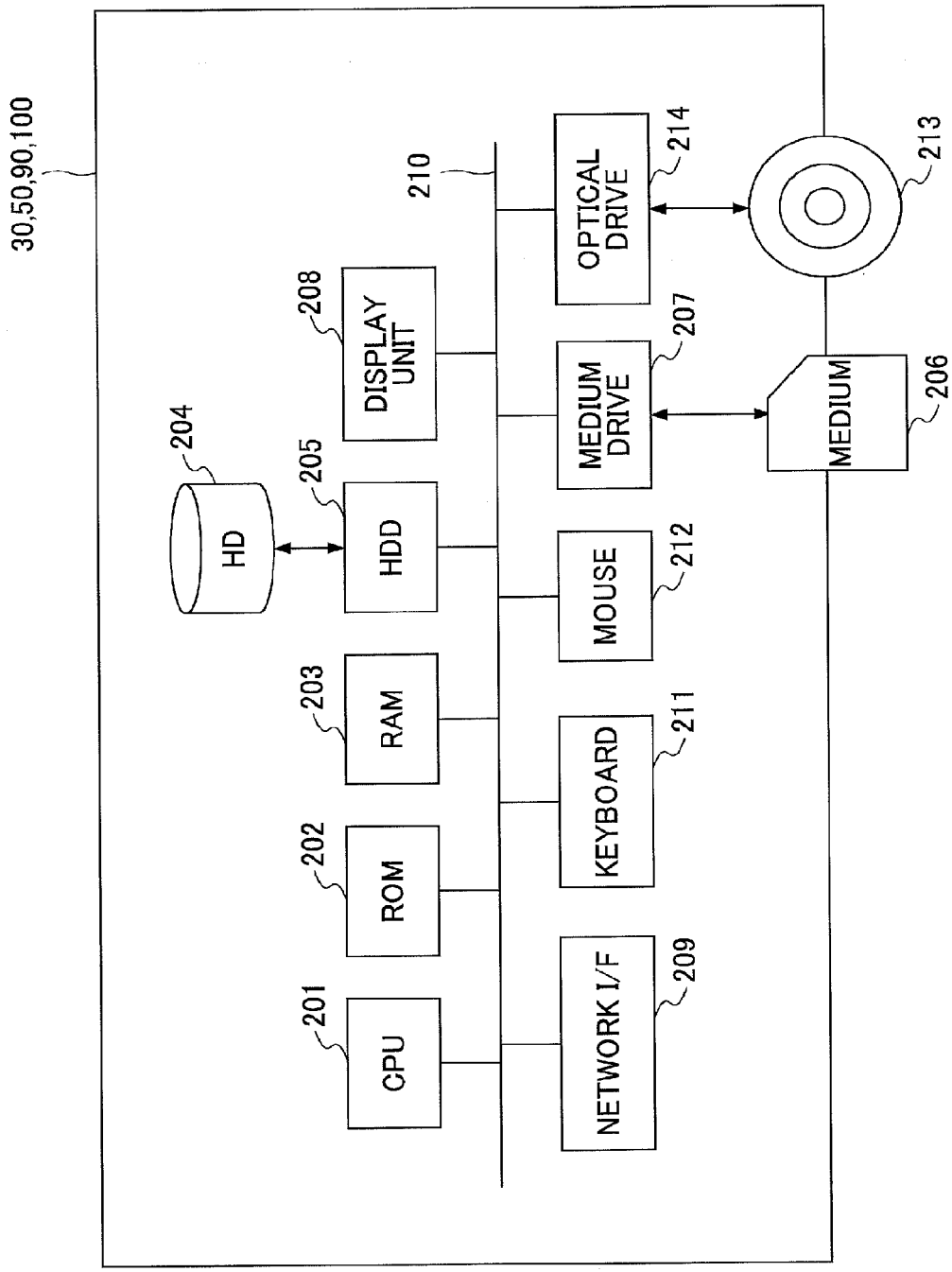
FIG. 6 is a hardware configuration diagram illustrating an example of a management apparatus according to the embodiments.

FIG. 6 is a diagram illustrating a hardware configuration of the management apparatus according to the embodiments. The management apparatus 50 includes elements of a typical computer, for example, a CPU 201; a ROM 202; a RAM 203; an HD 204; a HDD (hard disk drive) 205; a medium drive 207 and a display unit 208. Moreover, the management apparatus 50 includes a network I/F (interface) 209; a keyboard 211; a mouse 212; an optical disk 214, a bus 210 or the like.

The CPU 201 is, for example, a processing unit that reads out a program or data from the ROM 202, the HD 204 or the like and performs a process, to enable respective functions, with which the management apparatus 50 is provided. The ROM 202 is a non-volatile memory that preliminarily stores a program or the like used for starting the CPU 201, such as an IPL. The RAM 203 is a volatile memory that is used as a work area or the like for the CPU 201.

The HD 204 is a storage device that stores programs such as an OS or application programs and various types of data. The HDD 205 controls reading/writing of various types of data from/to the HD 204 under control of the CPU 201. The display unit 208 is a display means for displaying various types of information such as a cursor, a menu, a window, characters or an image.

The network I/F 209 is a communication interface for performing data transmission by using the communication network 2. The keyboard 211 is an example of an input device for accepting a user's input operation for inputting characters, a numerical value, various types of instructions or the like. The mouse 212 is an example of a pointing device for accepting a user's operation of selection or execution of various types of instructions, selection of a process object, movement of a cursor or the like.

The medium drive 207 controls, for example, reading/writing (storage) of data from/to a recording medium 206, such as a memory card. The optical drive 214 controls reading/writing of data from/to various types of optical disks 213, as an example of a detachable recording medium. The bus 210 couples electrically the above-described elements, and transmits an address signal, a data signal, various types of control signals and the like.

Meanwhile, the hardware configuration of the above-described computer is an example. For example, the display unit 208, the keyboard 211, the mouse 212 or the like may be provided externally outside the management apparatus 50.

Meanwhile, the above-described program for the management apparatus 50 may be distributed as a file in an installable form or in an executable form stored in a recording medium readable by a computer such as the above-described recording medium 206, an optical disk 213 or the like. Moreover, the above-described program for the management apparatus 50 may be, for example, stored in the HD 204, preliminarily stored in the ROM 202 or the like.

Moreover, since the relay apparatus 30 has the same hardware configuration as the above-described management apparatus 50, an explanation will be omitted. However, a program for the relay apparatus for controlling the relay apparatus 30 is stored in the HDD 204. Also in this case, the program for the relay apparatus may be distributed as a file in an installable form or in an executable form stored in a recording medium readable by a computer, such as the recording medium 206, the optical disk 213 or the like. The program for the relay apparatus may be stored in the HD 204, preliminarily stored in the ROM 202 or the like.

Furthermore, since the program provision apparatus 90 and the maintenance apparatus 100 have the same hardware configuration as the management apparatus 50, an explanation will be omitted. However, a program for controlling the program provision apparatus 90 is stored in the HDD 204. Also in this case, the program for the program provision apparatus 90 may be distributed as a file in an installable form or in an executable form stored in a recording medium readable by a computer, such as the recording medium 206, the optical disk 213 or the like. The program for the program provision apparatus 90 may be stored in the HDD, preliminarily stored in the ROM 202 or the like.

Next, a functional configuration of the transmission system 1 will be described.

First Embodiment

Figure 7:
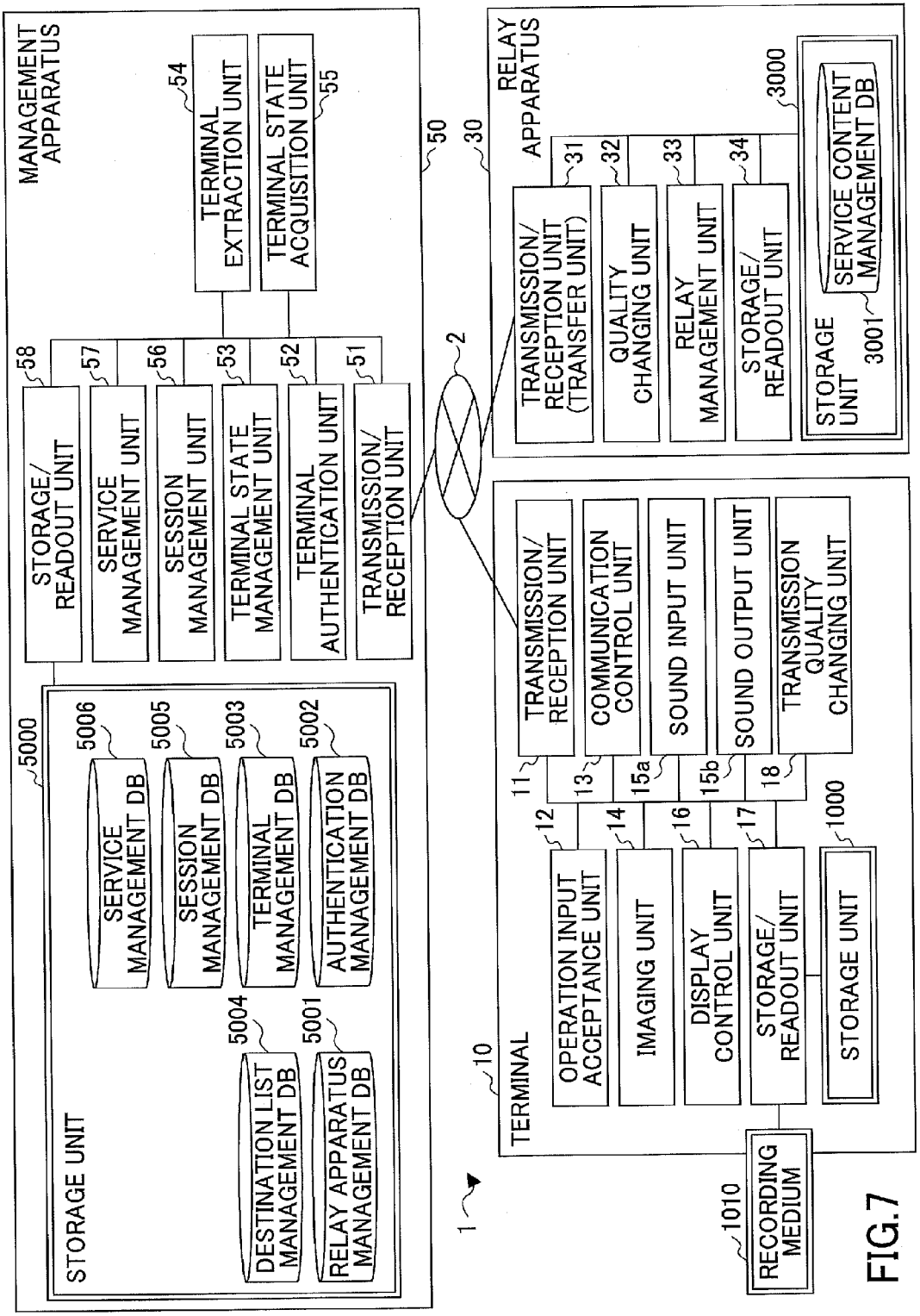
FIG. 7 is a functional configuration diagram illustrating an example of a transmission system according to a first embodiment.

<Functional Configuration>
FIG. 7 is a functional configuration diagram illustrating a transmission system according to a first embodiment. In FIG. 7, the transmission system 1 includes the terminal 10, the relay apparatus 30 and the management apparatus 50, which are connected so as to perform data communications via the communication network 2. Moreover, the program provision apparatus 90, shown in FIG. 1, is not relevant to the communication for the video conference directly, and is omitted in FIG. 7.

(Functional Configuration of Terminal)
The terminal 10 includes a transmission/reception unit 11; an operation input acceptance unit 12; a communication control unit 13; an imaging unit 14, a sound input unit 15a, a sound output unit 15b, a display control unit 16, a storage/readout unit 17, and a transmission quality changing unit 18. Each of the above units is a function or a functioning means enabled by any of the respective components, shown in FIG. 5, operating according to an instruction from the CPU 101 following the program for the terminal 10, which has been copied from the flash memory 104 onto the RAM 103. Moreover, the terminal 10 includes a storage unit 1000, enabled by the RAM 103 shown in FIG. 5 and the flash memory 104 shown in FIG. 5. Furthermore, in the terminal 10, a recording medium 1010 comprising the recording medium 106, shown in FIG. 5, is inserted, and reading or writing various types of data is performed by the storage/readout unit 17.

(Functional Configuration of Terminal)
Next, the functional configuration of the terminal 10 will be explained in detail. Meanwhile, in the following, in the explanation of the respective functions of the terminal 10, a relationship with the main component, which enables the respective functions of the terminal 10, among the respective components shown in FIG. 5, also will be described.

The transmission/reception unit 11 is enabled by the instruction from the CPU 101 shown in FIG. 5 and the network I/F 111, shown in FIG. 5, and sends various data (or information) to and receives various data (or information) from other terminals, other apparatuses, or other systems, via the communication network 2. The transmission/reception unit 11 starts receiving before starting communicating with an intended destination terminal, status information indicating a status of each of the terminals as candidates of destination, from the management apparatus 50. Meanwhile, the status information indicates not only operating status (online state or offline state) of each of the terminals 10, but also detailed information, such as, in the online state, whether calling is possible, whether it is busy, whether a user is leaving her/his seat, or the like. The status information may indicate not only the operational status of each of the terminals 10 but also information of the status around the terminal, such that the cable 120c is taken off from the terminal 10, an image is not output while a voice signal is output, voice sound is muted, or the like. In the following, an example where the status information indicates the operational status will be described.

The operation input reception unit 12 is enabled by the instruction from the CPU 101 shown in FIG. 5, the operation button 108 and the power switch 109, shown in FIG. 5, and accepts various inputs from a user. For example, when the user turns the power switch 109 shown in FIG. 5 to "ON", the operation input acceptance unit 12 accepts a signal of the user's operation, and turns on the power.

The communication control unit 13 is enabled by the instruction from the CPU shown in FIG. 5. The communication control unit 13, for example, at a timing of accepting the above-described power ON, from the transmission/reception unit 11 to the management apparatus 50 via the communication network 2, automatically sends login request information indicating requiring login and an IP address of the request source terminal at present. Moreover, when the user turns the power switch from ON state to OFF, after the transmission/reception unit 11 sends status information indicating turning the power OFF to the management apparatus 50, the operation input acceptance unit 12 turns the power OFF. Accordingly, the side of the management apparatus 50 can perceive that the power of the terminal 10 is turned from ON to OFF.

Moreover, the communication control unit 13 performs various communication controls, such as establishing, cutting off or the like a communication session sending/receiving content data to/from the other terminal 10 via the relay apparatus 30. Meanwhile, the communication control unit 13 according to the first embodiment sends, to the management apparatus 50, control information (e.g. start request information or start response information, which will be described later) for a session with a service ID for identifying a service content to be provided to the terminal 10.

The imaging unit 14 is enabled by the instruction from the CPU 101 shown in FIG. 5, the camera 112 and the imaging element I/F 113, shown in FIG. 5, and outputs image data of an object obtained by capturing a subject and converting captured data into predetermined image (video) data.

The sound input unit 15a is enabled by the instruction from the CPU 101 shown in FIG. 5 and the sound input/output I/F 116, shown in FIG. 5, and outputs predetermined voice data obtained by converting voice of a user into an electric signal at the microphone 114. The sound output unit 15b is enabled by the instruction from the CPU 101 shown in FIG. 5 and the sound input/output I/F 116, shown in FIG. 5, and outputs a voice signal, obtained by converting the voice data, to the speaker 115, then sound is output from the speaker 115.

Figure 3:
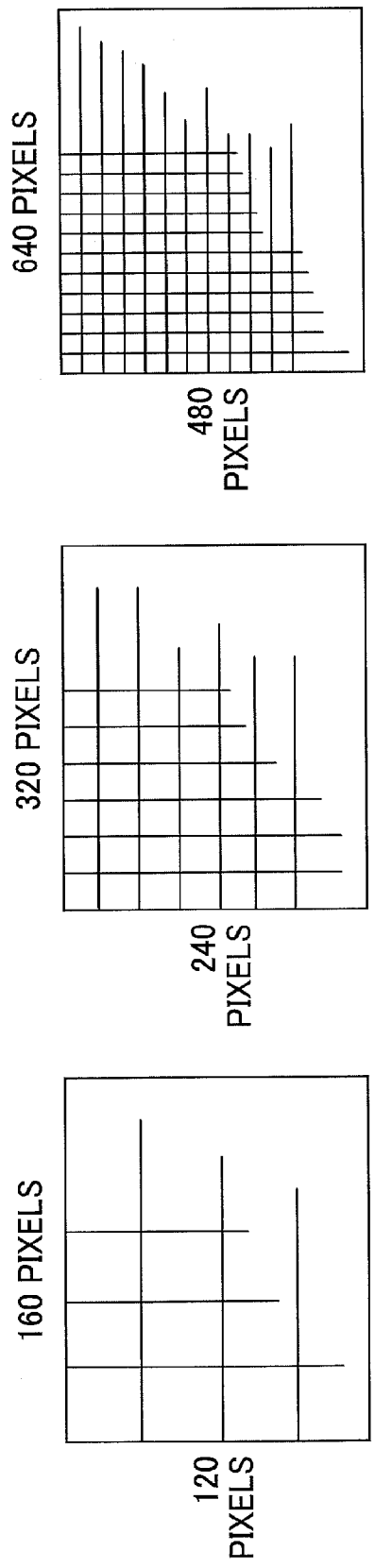
FIGS. 3A to 3C are conceptual diagrams for explaining an example of image quality of image data according to the embodiments.

The display control unit 16 is enabled by the instruction from the CPU 101 shown in FIG. 5 and the display I/F 117, shown in FIG. 3. Moreover, the display control device 16 controls, as described later, controls for combining received image data, resolutions of which are different from each other, and sending the combined image data to the display device 120. Moreover, the display control unit 16 may send to the display device 120 information on a destination list received from the management apparatus 50, and display the destination list on the display device 120.

The storage/readout process unit 17 is enabled by the instruction from the CPU 101 shown in FIG. 5 and the SSD 105, shown in FIG. 5, or the storage/readout process unit 17 is enabled by the instruction from the CPU 101. The storage/readout unit 17 stores various data into the storage unit 1000, and reads out various data stored in the storage unit 1000. The storage unit 1000 stores a terminal ID (identification) for identifying the terminal 10, a password and the like. Furthermore, the storage unit 1000 stores image data and voice data received in the communication with the destination terminal, while overwriting the previously stored data. Image data in the previously stored data, to be overwritten, are converted and output from the display device 120 as images, and voice data in the previously stored data are converted and output from the speaker 115 as voice sound.

Moreover, the storage/readout unit 17 reads out a service ID from a recording medium 1010 which stores the service ID (service identification information) for identifying a service to be provided to the terminal 10. Meanwhile, the recording medium 1010 storing the service ID may be, for example, a rewritable recording medium such as a memory card or may be, for example, a recording medium such as a SIM card in which contract information or the like for the user is recorded.

Moreover, in a case where the recording medium 1010 is a SIM card, the service ID may be SIM identification information or the like regarding the contract information for the user, or may be information regarding service content which is stored separately from the SIM identification information.

Moreover, the terminal 10 may use the SIM identification information stored in the recording medium 1010 as a terminal ID, instead of the terminal ID stored in the storage unit 1000.

The terminal ID according to the first embodiment, and a relay apparatus ID and a service ID, which will be explained later, indicate an example of identification information, such as a language, a character, a symbol, various signs, or the like, used for uniquely identifying a terminal 10, a relay apparatus 30 and service content, respectively. Moreover, the terminal ID, the relay apparatus ID and the service ID may be identification information of a combination of at least two of the above-described language, the character, the symbol and the various signs.

Moreover, instead of the terminal ID, a user ID for identifying the user of the terminal 10 may be used. In this case, the terminal identification information includes not only the terminal ID but also the user ID.

The transmission quality changing unit 18 is enabled by the instruction from the CPU 101 shown in FIG. 5, and changes (converts) quality of content data that the terminal 10 sends.

In the first embodiment, the start instruction information, with which the management apparatus 50 requires the terminal 10 to start a session, includes information for specifying the quality of content data which the terminal 10 sends. Moreover, the terminal 10 sends the content data with the quality specified by the management apparatus 50. In a case where the terminal 10 quality of content data does not correspond to the quality of content data specified by the management system 50, the terminal 10 converts the quality of content data to be sent into the quality of content data specified by the management apparatus 50 by using the transmission quality changing unit 18.

(Functional Configuration of Management Apparatus)

The management apparatus 50 includes a transmission/reception unit 51, a terminal authentication unit 52, a terminal state management unit 53, a terminal extraction unit 54, a terminal state acquisition unit 55, a session management unit 56, a service management unit 57, a storage/readout unit 58 and the like. Each of the above units is a function or means enabled by one of the components, shown in FIG. 6, operating according to an instruction from the CPU 201 following the program for the management apparatus 50, which has been copied from the HD 204 onto the RAM 203. Moreover, the management apparatus 50 includes a storage unit 5000, configured by the HD 204, shown in FIG. 6.

(Functional Elements in Management Apparatus)

Next, each functional element in the management apparatus 50 will be explained in detail. In the following, in the explanation of the functional elements of the management apparatus 50, a relationship with the main component, which enables the respective functional elements of the management apparatus 50, among the respective components shown in FIG. 6, also will be described.

The transmission/reception unit 51 is executed by an instruction from the CPU 201 shown in FIG. 6 and the network I/F 209, shown in FIG. 6, and sends various data (information) to and receives various data (information) from another terminal, another apparatus or another system via the communication network 2.

The terminal authentication unit 52 is enabled by the instruction from the CPU 201 shown in FIG. 6. The terminal authentication unit 52 determines, for example, whether a combination of terminal ID and a password included in login request information received by the transmission/reception unit 51 is included in the authentication management DB (Database) 5002, to perform authentication of the terminal 10.

The terminal state management unit 53 is enabled by the instruction from the CPU 201 shown in FIG. 6, and manages the operational status of the request source terminal, which requires a login. The terminal state management unit 53 stores in the terminal management DB 5003 a destination name, an operational status, reception date and time of request information or the like, an IP address of the request source terminal and the like, for each terminal ID, by associating them with each other, to manage them. Moreover, the terminal state management unit 53 changes the operational state indicating "ONLINE" in the terminal management DB 5003 to "OFFLINE", based on status information indicating turning the power OFF, sent from the terminal 10, when the user turns a state of the power switch 109 of the terminal 10 from "ON" to "OFF". The terminal management DB 5003 will be described later.

The terminal extraction unit 54 is enabled by the instruction from the CPU 201 shown in FIG. 6. The terminal extraction unit 54 extracts a terminal ID by searching the destination list management DB 5004 with the terminal ID of the request source terminal, which requires a login, as a search key and reads out a terminal ID of a destination terminal which can communicate with the request source terminal. Moreover, the terminal extraction unit 54 searches the destination list management DB 5004 with the terminal ID of the request source terminal, which requires a login, as a search key, and also extracts terminal IDs of other request source terminals, for each of which the terminal ID of the above request source terminal is registered as a candidate of a destination terminal.

The terminal state acquisition unit 55 is enabled by the instruction from the CPU 201 shown in FIG. 6. The terminal state acquisition unit 55 searches the terminal management DB 5003, with the terminal ID of the candidate of the destination terminal extracted by the terminal extraction unit 54, as a search key, and reads out the operating status for each of the terminal IDs extracted by the terminal extraction unit 54. Accordingly, the terminal state acquisition unit 55 can acquire operating status of candidates of the destination terminal, which are allowed to communicate with the request source terminal, which has required the login. Moreover, the terminal state acquisition unit 55 searches the terminal management DB 5003, with the terminal ID extracted by the terminal extraction unit 54 as a search key, and also acquires the operational status of the request source terminal, which has required the login.

The session management unit 56 is enabled by the instruction from the CPU 201 shown in FIG. 6, and includes, for example, a session control unit 56a and a session information management unit 56b, as shown in FIG. 8.

In FIG. 8, the session control unit 56a performs a control of a session managed by the management apparatus 50, such as a session of a remote conference or content distribution. The control of session includes, for example, control for establishing a session, control for causing a terminal 10 to participate in the established session, control for cutting off the session, control for generating a session ID or the like.

The session information management unit 56b stores a request source terminal ID of the terminal 10, which requires to start the session, a destination terminal ID of the destination terminal 10 and the like in the session management DB 5005 in association with the session ID generated by the session control unit 56a, to manage them. The session management DB 5005 will be described later.

The service management unit 57 shown in FIG. 7 is enabled by the instruction from the CPU 201 shown in FIG. 6, and includes, for example, a service information management unit 57a, a service ID acquisition unit 57b and a service content determination unit 57c, as shown in FIG. 8.

In FIG. 8, the service information management unit 57a stores, in the service management DB 5006, a service ID for identifying service content provided to each of the terminals 10 managed by the management apparatus 50 and service content corresponding to each service ID, to manage them. The service information management unit 57a preliminarily stores in the service management DB 5006, for example, a service ID and service content corresponding to the service ID in association with each other, in response to an operation by an administrator of the management apparatus 50, request information from another information processing apparatus or the like. The service management DB 5006 will be described later.

The service ID acquisition unit 57b acquires a service ID of each of the terminals 10 participating in the session. For example, the service ID acquisition unit 57b acquires a message such as start request information received from each of the terminals 10 participating in the session or start response information from the session management unit 56a, and acquires (extracts) a service ID included in the acquired information.

Moreover, as another example, the service ID acquisition unit 57b may acquire identification information (terminal ID) of the terminal 10 from information received from each of the terminals 10, to acquire a service ID from a database or the like which preliminarily stores a terminal ID and a service ID associated with each other.

The service content determination unit 57c determines service content of the session, based on service IDs of the terminals 10 participating in the session, acquired by the service ID acquisition unit 57b. The service content determination unit 57c, for example, includes a transfer quality determination unit 57d and a transmission quality determination unit 57e, as shown in FIG. 8.

The transfer quality determination unit 57d determines quality of content data which the relay apparatus 30 transfers to each of the terminals 10 participating in the session, based on the service content of the session determined by the service content determination unit 57c.

The transmission quality determination unit 57e determines quality of content data which each of the terminals 10 participating in the session sends based on the service content of the session determined by the service content determination unit 57c.

Preferably, the quality of the above-described content data includes quality items of a frame rate of image data, a bit rate, resolution, image quality, color depth or the like. Moreover, preferably, the quality of content data includes quality items of a sampling rate of sound (voice) data, a bit rate, a quantized bit number or the like.

Returning to FIG. 7, description of the functional configuration of the management apparatus 50 continues.

The storage/readout unit 58 of the management apparatus 50 is enabled by the instruction from the CPU 201 shown in FIG. 6 and the HDD 205, or enabled by the instruction from the CPU 201. The storage/readout unit 58 stores various types of data to the storage unit 5000, and reads out various data from the storage unit 5000.

<Functional Configuration of Relay Apparatus>

The relay apparatus 30 includes a transmission/reception unit (transfer unit) 31, a quality changing unit 32, a relay management unit 33 and a storage/readout unit 34. Each of the above units is a function or means enabled by one of the components, shown in FIG. 6, operating according to an instruction from the CPU 201 following the program for the relay apparatus, which has been copied from the HD 204 onto the RAM 203. Moreover, the relay apparatus 30 includes a storage unit 3000, comprising the RAM 203 shown in FIG. 6 and/or the HD 204 shown in FIG. 6.

(Functional Configuration in the Relay Apparatus)

Next, the functional configuration of the relay apparatus 30 will be described. Meanwhile, in the following, in the explanation of the functional configuration of the relay apparatus 30, a relationship with the main component, which enables the respective functions of the relay apparatus 30, among the respective components shown in FIG. 6, also will be described.

The transmission/reception unit (transfer unit) 31 is enabled by the instruction from the CPU 201 shown in FIG. 6 and the network I/F 209 shown in FIG. 6, and sends various data (information) to and receives various data (information) from another terminal, another apparatus or another system via the communication network 2. Moreover, the transmission/reception unit 31 also plays a role of a transfer unit, and transfers (relays) content data (image data, sound data or the like) received from the terminal 10 participating in the session to another terminal 10 participating in the session following an instruction from the relay management unit 33.

The quality changing unit 32 is enabled by the instruction from the CPU 201 shown in FIG. 6. The quality changing unit 32 changes (converts) a quality of the content data transferred by the transmission/reception unit 31 following the instruction from the relay management unit 33.

The relay management unit 33 is enabled by the instruction from the CPU 201 shown in FIG. 6, and includes, for example, a service content management unit 33a, a quality setting unit 33b and a relay control unit 33c.

The service content management unit 33a stores, in the service content management DB 3001, session information received from the management apparatus 50 via the transmission/reception unit 31, to manage it. The service content management DB 3001 will be described later.

The quality setting unit 33b sets content of conversion (change) for communication quality in the quality changing unit 32, based on the session information stored in the service content management DB 3001, when the session starts.

The relay control unit 33c controls a transfer (relay) process for content data by the transmission/reception unit (transfer unit) 31. For example, the relay control unit 33c sends the transfer destination or the like of content data received from each of the terminals 10 participating in the session to the transmission/reception unit (transfer unit) 31.

According to the above-described configuration, the quality changing unit 32 in the relay apparatus 30, based on the session information managed in the service content management unit 33a, changes the quality of content data transferred at the transmission/reception unit (transfer unit) 31, and sends them to the designated transfer destination.

For example, the relay apparatus 30, in a session with a session ID "se3" shown in FIG. 12, converts content data received from a terminal "A" into quality of "10 fps, HD", "22.05 kHz", and transfers them to a terminal "B". Similarly, the relay apparatus 30 converts content data received from the terminal "B" into quality of "20 fps, SD", "22.05 kHz", and transfers them to the terminal "A". At this time, the relay apparatus 30 may transfer content data without converting quality of the content data, in a case where quality of content data of a transfer destination is the same as quality of content data received from a transfer source.

Next, the management databases (DBs) stored in the storage unit 5000 of the management apparatus 50 will be described. FIGS. 10A to 11C are conceptual diagrams illustrating the respective management tables managed in the management apparatus according to the first embodiment.

(Relay Apparatus Management DB)

The relay apparatus management DB 5001 stored in the storage unit 5000 of the management apparatus 50 includes, for example, a relay apparatus management table 1001 as shown in FIG. 10A. In the relay apparatus management table 1000, for each relay apparatus ID of the relay apparatuses 30, the operating state of the relay apparatus 30, the reception date/time of the operating state, the IP address of the relay apparatus 30, the maximum data transfer rate (Mbps) of the relay apparatus 30 and the like are stored in association with one another. For example, the relay apparatus management table 1001 illustrated in FIG. 10A indicates that the relay apparatus 30a with the relay apparatus ID "111a" has the operating state "online". Moreover, the relay apparatus management table 1001 shows that the reception date/time of the operating state at the management apparatus 50 is "Apr. 10, 2014, 13:00". Moreover, the relay apparatus management table 1001 also indicates that the IP address of the relay apparatus 30a is "1.2.1.2" and the maximum data transfer rate in the relay apparatus 30a is "100 Mbps".

(Authentication Management Table)

Moreover, the authentication management DB 5002 stored in the storage unit 5000 of the management apparatus 50 includes, for example, an authentication management table 1002 as shown in FIG. 10B. In the authentication management table 1002, each terminal ID of the terminal 10 managed by the management apparatus 50 and a password t0 of each the terminal 10 are stored and managed in association with each other. For example, the authentication management table 1002, illustrated in FIG. 10B, indicates that the terminal ID of the terminal 10 is "01aa", and the password of the terminal 10 is "aaaa".

(Terminal Management Table)

Furthermore, a terminal management DB 5003 stored in the storage unit 5000 of the management apparatus 50 includes, for example, a terminal management table 1003 as shown in FIG. 10C. In the terminal management table 1003, for each terminal ID of the terminal 10, a destination terminal name in the case where the terminal 10 serves as a destination terminal, the operating state of the terminal 10, a date/time received at which login request information described later is received by the management apparatus 50, and the IP address of the terminal 10 are stored in association with one another. For example, the terminal management table 1003 illustrated in FIG. 10C indicates that the terminal 10 with the terminal ID "01aa" has the destination terminal name "AA terminal, Tokyo office, Japan", the operating state "online (communication OK)", the date/time received at which login request information is received by the management apparatus 50 "Apr. 10, 2014, 13:40", and the IP address "1.2.1.3".

(Candidate List Management Table)

Moreover, a destination list management DB 5004 stored in the storage unit 5000 of the management apparatus 50 includes, for example, a destination list management table 1101 as shown in FIG. 11A. In the destination list management table 1101, the terminal IDs of all destination terminals 10 registered as candidate destination terminals are stored in association with a terminal ID of a request source terminal that sends a request to start communication (transmission) in a video conference. For example, the candidate list management table 1101 illustrated in FIG. 11A indicates that candidates for a destination terminal to which a request source terminal with a terminal ID "01ab" can send a request to start communication in a video conference are the terminal with a terminal ID "01aa", the terminal with a terminal ID "01ba" and the terminal with a terminal ID "01bb". The candidate destination terminals are updated by addition or deletion in response to an addition or deletion request received from an arbitrary request source terminal to the management apparatus 50.

(Session Management Table)

Furthermore, a session management DB 5005 stored in the storage unit 5000 of the management apparatus 50 includes a session management table 1102 as shown in FIG. 11B. The session management table 1102 manages, for each session ID, which is identification information of a session, a relay apparatus ID of a relay apparatus 30 which is used for relaying, a terminal ID of a request source terminal, a terminal ID of a destination terminal, a delay time (ms), a reception date/time of the delay time and the like.

(Service Management Table)

Furthermore, a service management DB 5006 stored in the storage unit 5000 of the management apparatus 50 includes, for example, a service management table 1103 as shown in FIG. 11C. In the service management table 1103 for each service ID, an image quality parameter, and a sound quality parameter are stored and managed in association with each other.

The service ID is an example of service identification information for identifying service content provided to each of the terminals 10 (or users of the terminals 10) managed by the management apparatus 50.

The image quality parameter and the sound quality parameter are an example of information specifying quality of content data of the session included in the service content provided to the terminal 10 or to the users of the terminals 10.

The image quality parameter includes, for example, a frame rate, a bit rate, image quality, resolution, color depth or the like. In the example shown in FIG. 11C, the image quality parameter includes a frame rate and reception image quality. The frame rate represents a number of frames of image processed in a unit time and expressed in a unit of fps (frame per second), for example. Moreover, the reception image quality is indicated by "SD" (standard definition) for image of standard image quality or "HD" (high definition) for image of high definition image quality, resolution of which is higher than SD.

The greater a value of the frame rate, i.e. value of fps is, more fluid a motion of an image (motion picture) is. However, an amount of transmitted data becomes greater. Moreover, a reception image quality of "HD" is higher than that of "SD". But, an amount of transmitted data becomes greater. Therefore, in a case where an available communication bandwidth is restricted, when priority is given to image quality to select "HD", the frame rate may be reduced. In contrast, when priority is given to a motion to increase the value of fps, the image quality may decrease.

In contrast, an example of the sound quality parameter includes a sampling rate, a bit rate, quantized bit number of the like. In the example shown in FIG. 11C, the sound quality parameter includes a sampling rate. The sampling rate represents a number of samples of voice (sound) per unit time, and expressed by, for example, a sampling frequency. The higher the sampling frequency is, the better the sound quality is.

Meanwhile, information that specifies communication quality included in the service content may include information indicating coding system or the like. For example, in a case where in the terminal 10 a plurality of coding systems (H.264/AVC, H.264/SVC, H.265 and the like) are available for processing images, the information including service content in the service management table 1103 may be information for specifying the coding system or the like.

Meanwhile, content of the service management table 1103 is a parameter which is preliminarily set by the administrator of the management apparatus 50, a provider of service or the like.

Next, the service content management DB 3001 stored in the relay apparatus 30 will be described.

(Service Content Management DB)

FIG. 12 is a conceptual diagram illustrating the service content management table according to the first embodiment. A service content management DB 3001 stored in the storage unit 3000 of the relay apparatus 30 includes, for example, a service content management table 1201 as shown in FIG. 12. The service content management table 1201 stores session information based on service content of each session determined by the service content determination unit 57c of the management apparatus 50, in association with a session ID that is identification information of each session. Moreover, the session information includes, for example, as shown in FIG. 12, a terminal ID which is identification information of terminals 10 participating in each session, and information indicating quality of content data transferred to each terminal ID (reception image quality parameter and reception sound quality parameter).

<Flow of Process>

Next, a flow of process according to the first embodiment will be described.

(Flow of Process in Management Apparatus)

Figure 13:
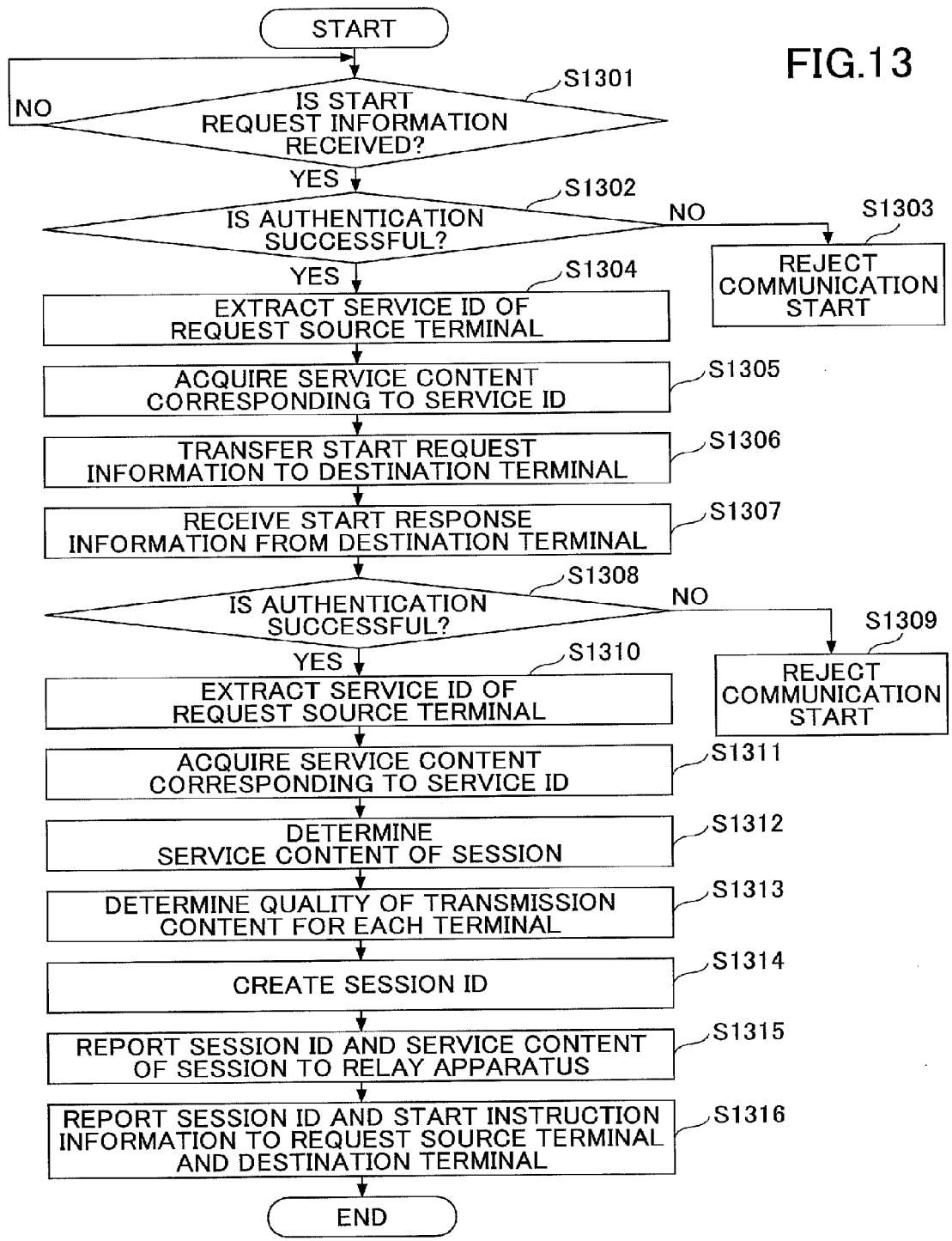
FIG. 13 is a flowchart illustrating an example of an operation of establishing a communication session in the management apparatus according to the first embodiment.

FIG. 13 is a flowchart illustrating an example of an operation of establishing a communication session in the management apparatus according to the first embodiment.

Meanwhile, the transmission system 1 includes the relay apparatuses 30a to 30d. However, in the following, for ease of explanation, a predetermined relay apparatus 30 is assumed to be used for establishing the session.

In a case where a management apparatus 50 receives start request information requiring starting a session from a terminal 10 (step S1301: YES), the management apparatus 50 executes processes of and after step S1302. Meanwhile, in the following description, the terminal 10 that requires starting the session will be called request source terminal and a terminal 10 of a destination, to which the request source terminal requires coupling, will be called destination terminal.

The start request information received from the request source terminal includes, for example, a request source terminal ID, which is a terminal ID of the request source terminal, a destination terminal ID, which is a terminal ID of the destination terminal, a service ID, which is identification information for identifying service content provided to the request source terminal, and the like.

In a case where the terminal authentication unit 52 of the management apparatus 50 performs authentication for the request source terminal and the authentication is successful (step S1302: YES), processes of and after step S1304 are executed. In contrast, in a case where the authentication is not successful (step S1302: NO), the start of the session (communication) is rejected (step S1303). Meanwhile, in a case where the authentication of the request source terminal has already been successful by, for example, a process in a preparation stage, which will be described later with reference to FIG. 14, the management apparatus 50 may omit the process of step S1302.

The service ID acquisition unit 57b of the management apparatus 50 acquires (extracts) the service ID of the request source terminal included in the start request information (step S1304).

The service information management unit 57a of the management apparatus 50 acquires, from the service management DB 5006, the service content (e.g. information indicating quality of the content or the like) corresponding to the service ID of the request source terminal acquired by the service ID acquisition unit 57b (step S1305).

The session control unit 56a of the management apparatus 50 sends (transfers) the start request information requiring starting the session to the destination terminal (step S1306).

The session control unit 56a receives start response information, which is in response to the start request information, from the destination terminal (step S1307). The start response information received from the request source terminal includes a service ID, which is identification information for identifying service content provided to the destination terminal, or the like.

The terminal authentication unit 52 of the management apparatus 50 performs authentication for the destination terminal (step S1308). In a case where the authentication is successful (step S1308: YES), processes of and after step S1310 are executed. In contrast, in a case where the authentication is not successful, the start of the session (communication) is rejected (step S1309). Meanwhile, in a case where the authentication of the destination terminal has already been successful by, for example, a process in a preparation stage, which will be described later with reference to FIG. 14, the management apparatus 50 may omit the process of step S1308.

The service ID acquisition unit 57*b* of the management apparatus 50 acquires (extracts) the service ID of the destination terminal included in the start response information (step S1310).

The service information management unit 57*a* of the management apparatus 50 acquires, from the service management DB 5006, the service content (e.g. information indicating quality of the content or the like) corresponding to the service ID of the destination terminal acquired by the service ID acquisition unit 57*b* (step S1311).

The service content determination unit 57*c* (transfer quality determination unit 57*d*) of the management apparatus 50 determines the service content of the session required by the request source terminal (step S1312). For example, the service content determination unit 57*c* determines quality of content provided to the request source terminal based on the service content acquired at step S1305. Moreover, the service content determination unit 57*c* determines quality of content provided to the destination terminal based on the service content acquired at step S1311.

The service content determination unit 57*c* (transmission quality determination unit 57*e*) determines quality of content data, which each of the terminals 10 participating in the session sends, based on the service content of the session determined at step S1312 (step S1313). Meanwhile, the determination method for the content deta to be sent will be described later.

The session control unit 56*a* of the management apparatus 50 creates a session ID, which is identification information for identifying the session (step S1314).

The session control unit 56*a* reports, to the relay apparatus 30, the session ID created at step S1314 and session information based on the service content of the session determined at step S1313 (step S1315). The session information includes, for example, information indicating the quality of the content data transferred to the request source terminal by the relay apparatus 30 and information indicating the quality of the content data transferred to the destination terminal.

The session control unit 56*a* sends session start instruction information for starting the session to the request source terminal and the destination terminal (step S1316). The session start instruction information includes a session ID created at step S1315 and information for specifying quality of content data sent to the terminal 10 determined based on the service content of the session at step S1313.

According to the processes illustrated in FIG. 13, in a session among the terminals 10, based on respective service contents for the terminals participating in the session, the service content of the session can be easily controlled.

Meanwhile, in the above-described explanations, the management apparatus 50 is assumed to hold a session using the predetermined relay apparatus 30. The above-described process is an example, and does not restrict the scope of the present invention. For example, the management apparatus 50 may start a session by selectively using one of the relay apparatuses 30*a* to 30*d*.

Next, a flow of a process in the transmission system 1 will be described with reference to a sequence diagram.

(Process at Preparation Stage)

Figure 14:
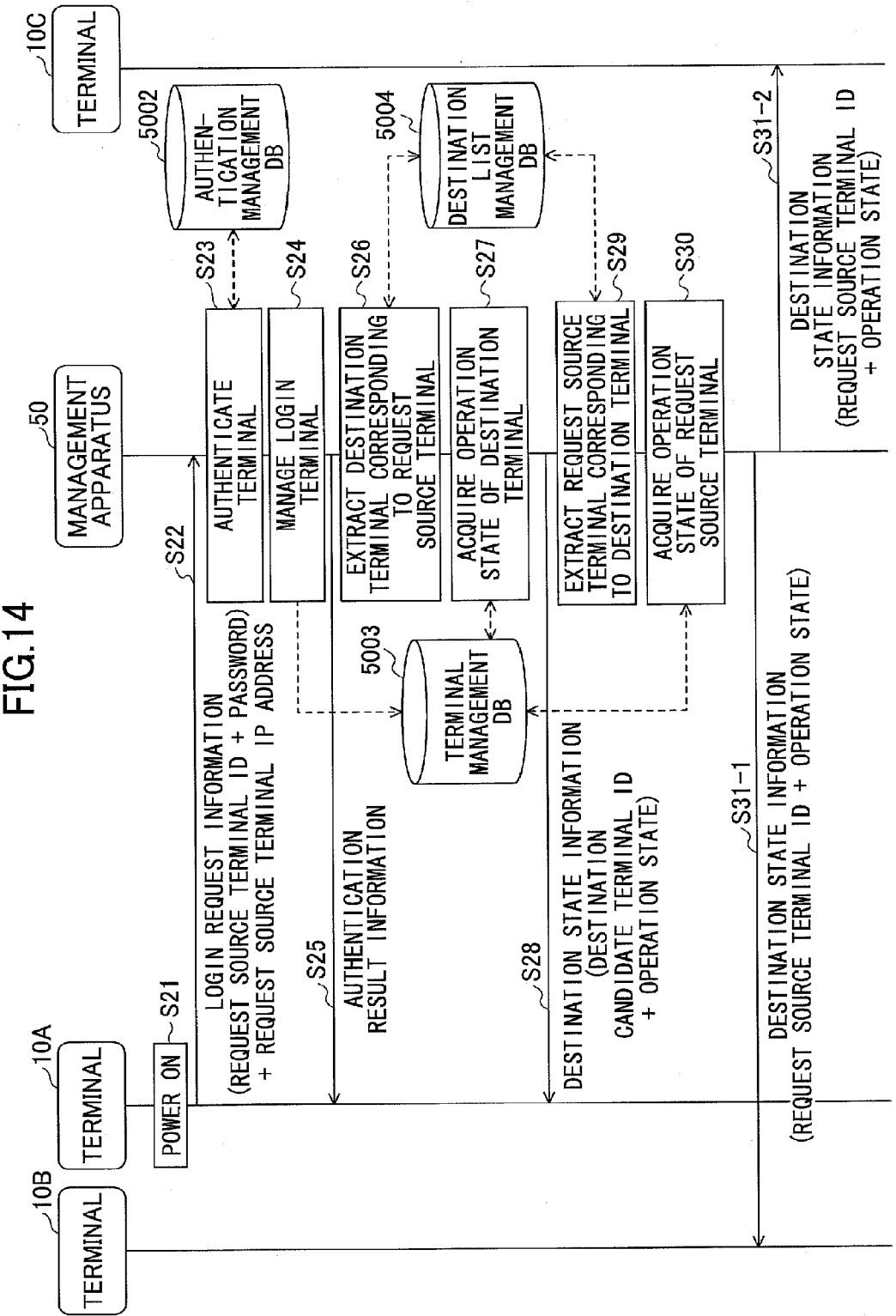
FIG. 14 is a sequence diagram illustrating an example of an operation in a preparation stage for the transmission system according to the first embodiment.

FIG. 14 is a sequence diagram illustrating an example of a process in a preparation stage for the transmission system according to the first embodiment. In the following, as an example, a process in a preparation stage before starting the session by a terminal 10A, a terminal 10B and a terminal 100 will be described. Meanwhile, in the following explanation, terminal IDs of the terminals 10A, 10B and 100 are assumed to be "01*aa*", "01*ba*" and "10*db*", respectively. Moreover, in FIG. 14, management information is assumed to be sent or received by the session for management information "sei", as shown in FIG. 2.

At first, in a case where a user of the terminal 10A, that is the request source terminal, turns on the power switch 109, shown in FIG. 5, the operation input acceptance unit 12, shown in FIG. 7, accepts the user's operation, and the power of the terminal 10A is turned ON (step S21). Then, the communication control unit 13, when receiving the operation for turning on the power, sends login request information, indicating a login required, to the management apparatus 50 from the transmission/reception unit 11 via the communication network 2 (step S22). Meanwhile, transmission of the login request information by turning the power switch 109 ON is an example. For example, the login request information may be sent by an operation of the operation buttons 108 by the user.

Moreover, the login request information includes the terminal ID (request source terminal ID) for identifying the terminal 10A as the request source terminal and a password. The terminal ID and the password have been read out from the storage unit 1000 via the storage/readout process unit 17. Alternatively, the terminal ID and the password may be stored in the recording medium 1010 and may be read out from the recording medium 1010 or the like. Moreover, when the login request information is sent from the terminal 10A to the management apparatus 50, the management apparatus 50 on the reception side can recognize the IP address of the terminal 10A on the transmission side.

Next, the terminal authentication unit 52 of the management apparatus 50 searches the above-described authentication management table 1002 with the terminal ID and the password as a search key included in the login request information received via the transmission/reception unit 51. The terminal authentication unit 52 performs terminal authentication by determining whether a combination of the terminal ID and the password included in the login request information received from the terminal 10A is included in the authentication management table 1002 (step S23).

In the case where the terminal authentication unit 52 determines that the login request information is from the terminal 10A, which has authorization for use, the terminal state management unit 53 changes an operational status corresponding to the terminal ID "01*aa*" of the terminal 10A stored in the terminal management table 1003 to "online (communication ok)". At this time, the terminal state management unit 53 updates a reception date/time, and as necessary, the IP address of the terminal 10 is updated (step S24). Accordingly, the terminal management table 1003 manages the operational status "online", the reception time "2014.4.10.13:40", and the IP address of the terminal 10*aa* "1.2.1.3", associated with the terminal ID "01*aa*" of the terminal 10A.

Then, the transmission/reception unit 51 of the management apparatus 50 sends authentication result information, indicating a result of the authentication obtained by the terminal authentication unit 52, via the communication network 2, to the request source terminal 10A, which has required the login (step S25). In the following, a process when the terminal authentication unit 52 determines that the request source terminal has authorization for use will be explained.

The terminal extraction unit 54 of the management apparatus 50 searches the destination list management table 1101 with the terminal ID "01*aa*" of the request source terminal which has required the login (terminal 10A) as a search key. Then, the terminal extraction unit 54 extracts a terminal ID of a candidate of a destination terminal, which can communicate with the request source terminal (terminal 10A) (step S26). In the first embodiment, for example, as terminal IDs of the destination terminals corresponding to the terminal ID "01aa" of the request source terminal (terminal 10A), terminal IDs "01ab", "01ba" and "01db" are assumed to be extracted.

Next, the terminal state acquisition unit 55 searches the terminal management table 1003 with the terminal IDs ("01ab", "01ba", "01db") of the candidates of the destination terminal extracted by the above-described terminal extraction unit 54 as a search key. Accordingly, the terminal state acquisition unit 55 reads out an operational status for each of the terminal IDs extracted by the terminal extraction unit 54, to acquire respective operational statuses of the terminal IDs ("01ab", "01ba", "01db") (step S27).

Next, the transmission/reception unit 51 sends destination status information including the operational statuses of the terminal IDs ("01ab", "01ba" and "01db") of the candidates of the destination terminal to the request source terminal (terminal 10A) via the communication network 2 (step S28). Accordingly, the request source terminal (terminal 10A) can recognize the operational status at present of each of terminal IDs ("01ab", "01ba" and "01db") of the candidates of the destination terminal for the request source terminal (terminal 10A).

Furthermore, the terminal extraction unit 54 of the management apparatus 50 searches the destination list management table 1101 with the terminal ID "01aa" of the request source terminal (terminal 10A), which has required the login, as a search key. Therefore, the terminal extraction unit 54 extracts other request source terminal IDs, for each of which the terminal ID "01aa" of the request source terminal (terminal 10A) is registered as a candidate of a destination terminal (step S29). In the destination list management table 1101, shown in FIG. 11A, the terminal IDs of the other request source terminals extracted as above, are "01ab", "01ba" and "01db".

Next, the terminal state acquisition unit 55 of the management apparatus 50 searches the terminal management table 1003 with the terminal ID "01aa" of the request source terminal (terminal 10A), which required the login, as a search key. Therefore, the terminal state acquisition unit 55 acquires an operational status of the request source terminal (terminal 10A) which required the login (step S30).

Then, the transmission/reception unit 51 extracts the terminal IDs ("01ba" and "01db") with the operational status of "online", in the terminal management table 1003, out of the terminal IDs ("01ab", "01ba" and "01db") extracted at step S29. Moreover, the transmission/reception unit 51 sends, to the terminal 10B and the terminal 10C corresponding to the extracted terminal IDs ("01ba", "01db"), destination status information including the terminal ID "01aa" of the request source terminal (terminal 10A) and the operational status of "online" (steps S31-1 and S31-2).

Meanwhile, upon the transmission/reception unit 51 sending the destination status information to the terminals 10B and 10C, based on the terminal IDs ("01ba" and "01db"), the transmission/reception unit 51 refers to the IP addresses of the terminals managed in the terminal management table 1003. Accordingly, the transmission/reception unit 51 can transfer to each of the destination terminals 10B and 10C, which can communicate with the request source terminal (terminal 10) having required the login, as a destination, the terminal ID "01aa" of the request source terminal (terminal 10A) and the operational status of "online".

On the other hand, also in the other terminals 10, for example, when the user turns on the power switch 109, shown in FIG. 6, in the same way as step S21, the operation input acceptance unit 12, shown in FIG. 7, accepts the operation for the power to be ON, and the same processes as in steps S22 to S31-1 and S31-2 are performed.

(Process of Communication Session)

Figure 15:
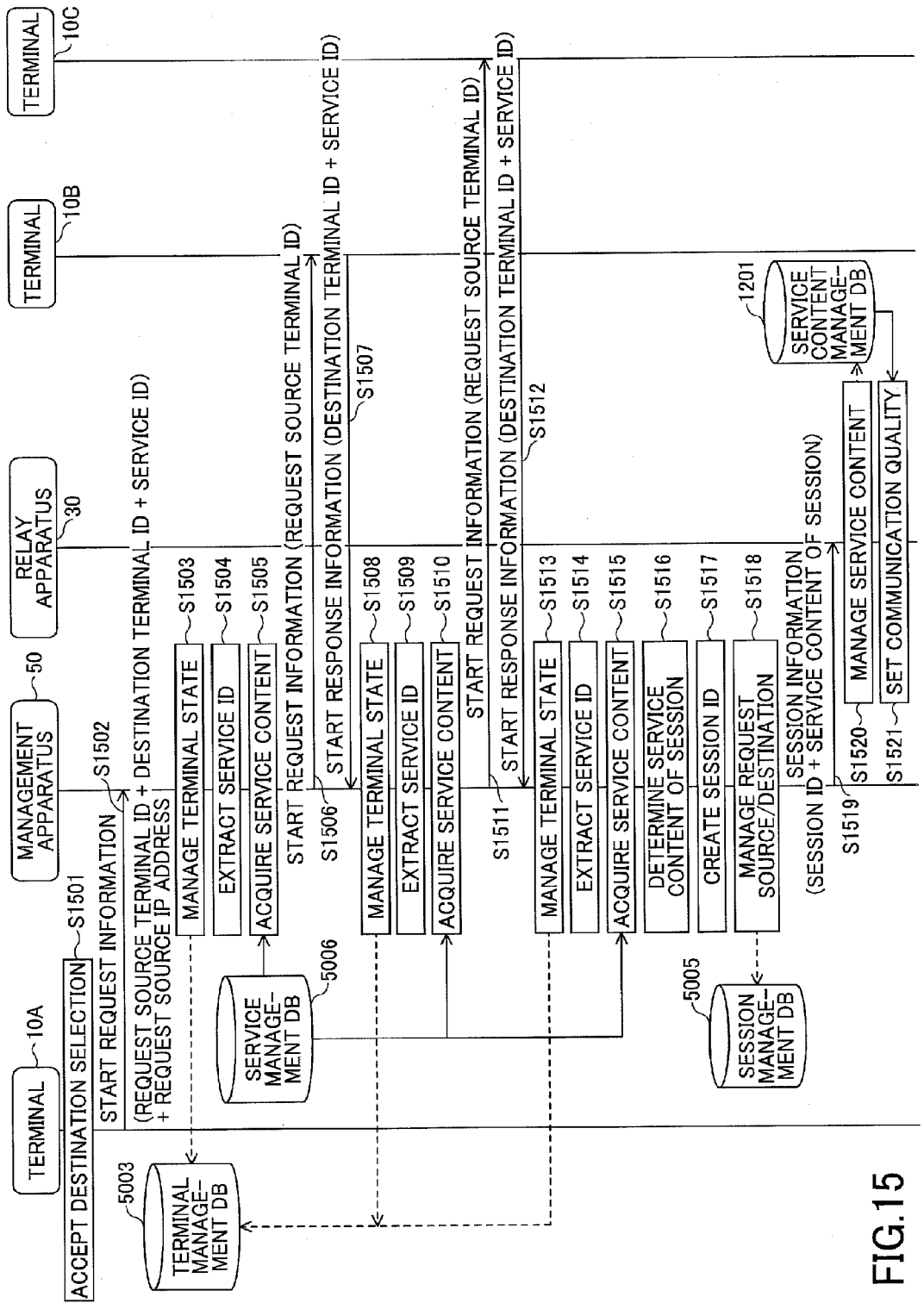
FIG. 15 is a sequence diagram illustrating an example of an operation of a communication session in the transmission system according to the first embodiment.
Figure 16:
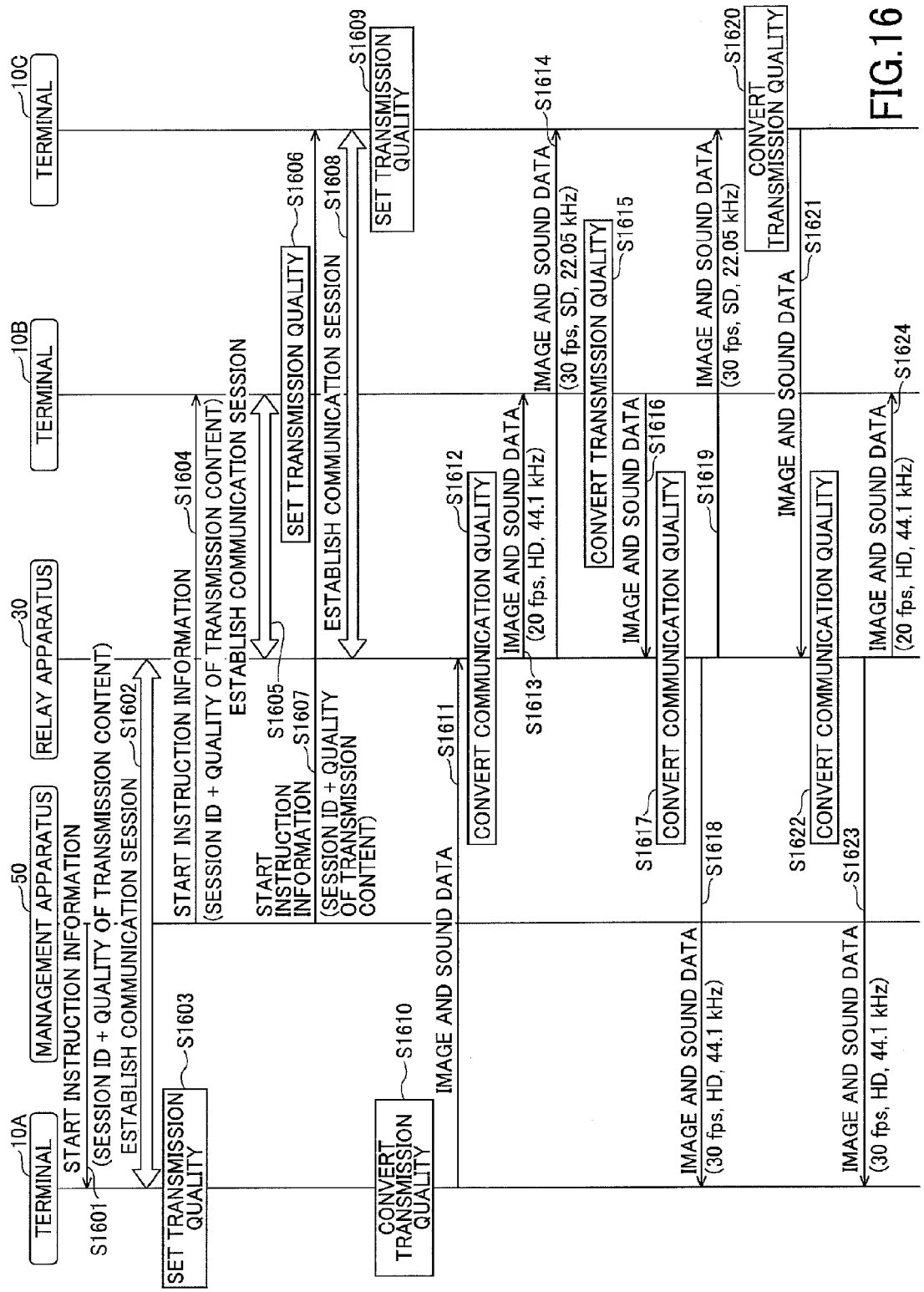
FIG. 16 is a sequence diagram illustrating another example of the operation of the communication session in the transmission system according to the first embodiment.

FIGS. 15 and 16 are sequence diagrams illustrating an example of a process of communication session of the transmission system according to the first embodiment. Meanwhile, also in FIGS. 15 and 16, management information is assumed to be sent or received by the session for management information "sei" shown in FIG. 2.

In a case where the terminal 10A accepts a selection operation for destination terminals (terminals 10B and 10C) by the user of the terminal 10A (step S1501), the terminal A sends start request information requiring the management apparatus 50 to start a session (step S1502). This start request information includes, for example, a request source terminal ID of the terminal 10A which is a request source terminal, destination terminal IDs of the terminals 10B and 10C which are destination terminals, and a service ID for identifying service content provided to the terminal 10A. Moreover, the start request information also includes an IP address of the terminal 10A (request source IP address).

The terminal state management unit 53 of the management apparatus 50, which receives the start request information from the terminal 10A, based on the terminal ID "01aa" of the request source terminal (terminal 10A) included in the start request information, updates the terminal management table 1003 (step S1503). For example, the terminal state management unit 53 changes the information of the operational status corresponding to the terminal ID "01aa" of the terminal 10A to "online (communication OK)" and updates also information on reception date/time.

The service ID acquisition unit 57b of the management apparatus 50 extracts a service ID included in the start request information received from the terminal 10A (step S1504).

The service information management unit 57a of the management apparatus 50 acquires, from the service management DB 5006, service content corresponding to the service ID of the terminal 10A acquired by the service ID acquisition unit 57a (step S1505). For example, the service information management unit 57a acquires, from the service management table 1103 shown in FIG. 11C, quality (reception frame rate, reception image quality, reception sampling rate and the like) of the content data corresponding to the service ID of the terminal 10A.

The session control unit 56a of the management apparatus 50 sends the start request information for requiring starting a session to the terminal 10B which is one of the destination terminals (step S1506). The start request information includes, for example, the request source terminal ID of the terminal 10A that is the request source terminal or the like.

The terminal 10B which receives the start request information from the management apparatus 50 sends start response information to the management apparatus 50 (step S1507). The start response information includes, for example, the destination terminal ID of the terminal 10B and a service ID.

The terminal state management unit 53 of the management apparatus 50 that receives the start response information from the terminal 10B, based on the terminal ID "01ba" of the terminal 10B included in the start response information, updates the terminal management table 1003 (step S1508). For example, the terminal state management unit 53 changes information on an operational state corresponding to the terminal ID "01ba" of the terminal 10B to "online (communication ok)", and updates information on reception date/time.

The service ID acquisition unit 57b of the management apparatus 50 extracts the service ID included in the start response information received from the terminal 10B (step S1509).

The service information management unit 57a of the management apparatus 50 acquires, from the service management DB 5006, service content corresponding to the service ID of the terminal 10B acquired by the service ID acquisition unit 57a (step S1510). For example, the service information management unit 57a acquires, from the service management table 1103 shown in FIG. 11C, quality of the content data corresponding to the service ID of the terminal 10B (reception frame rate, reception image quality, reception sampling rate and the like).

The session control unit 56a of the management apparatus 50 sends start request information for requiring starting a session to the terminal 10C, that is another one of the destination terminals (step S1511). The start request information includes, for example, the request source terminal ID of the terminal 10A that is the request source terminal.

The terminal 10C, which receives the start request information from the management apparatus 50, sends start response information to the management apparatus 50 (step S1512). The start response information includes, for example, a destination terminal ID of the terminal 10C and a service ID.

The terminal state management unit 53 of the management apparatus 50, which receives the start response information from the terminal 10C, based on the terminal ID "01db" of the terminal 10C included in the start response information, updates the terminal management table 1003 (step S1513). For example, the terminal state management unit 53 changes information on an operational state corresponding to the terminal ID "01db" of the terminal 10C to "online (communication ok)", and updates information on reception date/time.

The service ID acquisition unit 57b of the management apparatus 50 extracts the service ID included in the start response information received from the terminal 10C (step S1514).

The service information management unit 57a of the management apparatus 50 acquires from the service management DB 5006 service content corresponding to the service ID of the terminal 10C acquired by the service ID acquisition unit 57a (step S1515). For example, the service information management unit 57a acquires the quality (reception frame rate, reception image quality, reception sampling rate and the like) of the content data corresponding to the service IF of the terminal 10C from the service management table 1103 of FIG. 11C.

The service content determination unit 57c of the management apparatus 50 determines service content of the session (step S1516).

For example, the service content determination unit 57c determines, by the transfer quality determination unit 57d, quality (transfer quality) of content data transferred from the relay apparatus 30 to each of the terminals 10 based on the service contents of the respective terminals 10 acquired at steps S1505, S1510 and S1515.

Furthermore, the service content determination unit 57c determines, by the transmission quality determination unit 57e, quality of content data sent by each of the terminals 10 participating in the session based on the transfer quality determined by the transfer quality determination unit 57d.

As an example, assume that quality of image data transferred from the relay apparatus 30 to the terminal 10A is "30 fps, HD", and quality of image data transferred to the terminal 10B is "30 fps, SD". In this case, the transmission quality determination unit 57e determines the quality of image data sent by the terminal 10C to be "30 fps, HD", the quality of which is higher of the quality of image data of the terminal 10B. This is because it is generally easy to convert quality of image data to lower quality, and degradation of image quality is small. Moreover, the above-described control prevents the terminal 10C from sending image data with excessive quality, and thereby the communication bandwidth of the transmission system 1 can be used efficiently.

In this case, the terminal 10C sends image data with "30 fps, HD", and the relay apparatus 30 can transfer the image data sent from the terminal 10C to the terminal 10A without changing the quality of the image data. Moreover, the relay apparatus 30 converts the image data sent from the terminal 10C into "30 fps, SD", and transfers them to the terminal 10B.

In this way, the transmission quality determination unit 57e preferably determines the quality of content data, which the terminal 10C participating in the session sends, to be the higher quality of the qualities of content data transferred to the transfer destinations, i.e. the terminals 10A, 10B.

In the above-described example, the service content of session determined by the service content determination unit 57c at step S1516 includes the quality (transfer quality) of content data transferred to the respective terminals 10 from the relay apparatus 30 and the quality of content data sent by the respective terminals 10.

The session control unit 56a of the management apparatus 50 creates a session ID that is identification information for identifying the session (step S1517).

The session information management unit 56b stores the created session ID in the session management DB 5005 in association with the request source terminal ID (terminal ID of the terminal 10A) and the destination terminal ID (terminal IDs of the terminal 10B and the terminal 10C) (step S1518).

The session control unit 56a of the management apparatus 50 sends the session ID and session information based on the service content of the session determined at step S1516 to the relay apparatus 30 (step S1519). The session information includes information indicating quality of the content data transferred to each of the terminals 10 from the relay apparatus 30.

The service content management unit 33a of the relay apparatus 30, receiving the session information sent from the management apparatus 50, stores service content of the session included in the received session information in the service content management table 1201, and manages it (step S1520).

The quality setting unit 33b of the relay apparatus 30 performs setting for the quality changing unit 32 of the relay apparatus 30 based on service content of the session stored in the service content management table 1201 (step S1521). Accordingly, the quality changing unit 32 automatically converts the quality of the content that the transmission/reception unit (transfer unit) 31 transfers to each of the terminals 10A to 10C according to the quality stored in the service content management table 1201.

Subsequently, processes after step S1521 shown in FIG. 15 will be described with reference to FIG. 16.

The session control unit 56a of the management apparatus 50 sends start instruction information for instructing the terminal 10A to start a session (step S1601). The start instruction information includes a session ID that is identification information of the session and information specifying quality of content data sent from the terminal 10A.

The terminal 10A, receiving the start instruction information from the management apparatus 50, establishes a communication session (session "sed") with the relay apparatus 30 (step S1602).

The terminal 10A performs setting of transmission quality in the transmission quality changing unit 18 for changing quality of content data sent by the terminal 10A (step S1603).

The session control unit 56a of the management apparatus 50 sends the start instruction information for instructing to start a session also to the terminal 10B (step S1604). The start instruction information includes the session ID which is identification information of the session and information specifying quality of content data sent by the terminal 10B.

The terminal 10B, receiving the start instruction information from the management apparatus 50 establishes a communication session ("session "sed") with the relay apparatus 30 (step S1605).

The terminal 10B performs setting of transmission quality in the transmission quality changing unit 18 for changing quality of content data sent by the terminal 10B.

The session control unit 56a of the management apparatus 50 sends the start instruction information for instructing to start a session also to the terminal 10C (step S1607). The start instruction information includes the session ID which is identification information of the session and information specifying quality of content data sent by the terminal 10C.

The terminal 10C, receiving the start instruction information from the management apparatus 50 establishes a communication session ("session "sed") with the relay apparatus 30 (step S1608).

The terminal 10C performs setting of transmission quality in the transmission quality changing unit 18 for changing quality of content data sent by the terminal 10C.

According to the above-described processes, the terminals 10A to 10C become able to participate in the same session and send/receive content data such as image data, sound data or the like, to/from each other.

Meanwhile, in the example illustrated in FIGS. 15 and 16, it is explained that on starting the communication session among the terminals 10A, 10B and 10C, the management apparatus 50 sends the start request information to both the terminal 10B and the terminal 10C. The above-described sequence is only an example. For example, the management apparatus 50 may cause the terminal 10C to participate in an established session in the middle, after sending start request information to the terminal 10B to establish the communication session between the terminal 10A and the terminal 10B. In this case, the management apparatus 50 sends a session ID of the communication session established between the terminal 10A and the terminal 10B to the terminal 10C. Accordingly, the terminal 10C can require the management apparatus 50 to participate in the communication session established between the terminal 10A and the terminal 10B in the middle based on the received session ID.

Here, for example, a process for content data (image data and sound data) sent by the terminal 10A will be described.

In a case where quality conversion of content data is required in order to send content data with the transmission quality (frame rate, quality of image data or the like) set at step S1603, the terminal 10A converts the quality of content data to be sent (step S1610). In contrast, in a case where content data can be sent with the transmission quality set at step S1603 without the quality conversion, the terminal 10A can omit the process at step S1610.

The terminal 10A sends content data (for example, image data and sound data) to the relay apparatus 30 (step S1611).

The relay apparatus 30, which receives the content data from the terminal 10A, converts the quality of the content data by the quality changing unit 32, and transfers (relays) the received content data to the terminal 10B and the terminal 10C by the transmission/reception unit (transfer unit) 31 (step S1612).

Accordingly, for example, the session established in FIGS. 15 and 16 is assumed to be a session corresponding to the session ID "se1" in the service content management table 1201 shown in FIG. 12. In this case, image data sent to the terminal 10B corresponding to the terminal ID "01*ba*" are converted to 20 fps and HD, sound data are converted to 44.1 kHz, and the data are transferred to the terminal 10B (step S1613). Moreover, image data sent to the terminal 10C corresponding to the terminal ID "01*db*" are converted to 30 fps and SD, sound data are converted to 22.05 kHz, and the data are transferred to the terminal 10C (step S1614).

Next, a process for content data (image data and sound data) sent by the terminal 10B will be described.

In a case where quality conversion of content data is required in order to send content data with the transmission quality set at step S1606, the terminal 10B converts the quality of content data to be sent (step S1615). In contrast, in a case where content data can be sent with the transmission quality set at step S1606 without the quality conversion, the terminal 10B can omit the process at step S1615.

The terminal 10B sends content data (for example, image data and sound data) to the relay apparatus 30 (step S1616).

The relay apparatus 30, which receives the content data from the terminal 10B, converts the quality of the content data by the quality changing unit 32, and transfers (relays) the received content data to the terminal 10A and the terminal 10C by the transmission/reception unit (transfer unit) 31 (step S1617).

For example, in the above-described session ID "se1", image data sent to the terminal 10A corresponding to the terminal ID "01*aa*" are converted to 30 fps and HD, sound data are converted to 44.1 kHz, and the data are transferred to the terminal 10A (step S1618). Moreover, image data sent to the terminal 10C corresponding to the terminal ID "01*db*" are converted to 30 fps and SD, sound data are converted to 22.05 kHz, and the data are transferred to the terminal 10C (step S1619).

Furthermore, a process for content data (image data and sound data) sent by the terminal 10C will be described.

In a case where quality conversion of content data is required in order to send content data with the transmission quality set at step S1609, the terminal 10C converts the quality of content data to be sent (step S1620). In contrast, in a case where content data can be sent with the transmission quality set at step S1609 without the quality conversion, the terminal 10C can omit the process at step S1620.

The terminal 10C sends content data (for example, image data and sound data) to the relay apparatus 30 (step S1621).

The relay apparatus 30, which receives the content data from the terminal 10C, converts the quality of the content data by the quality changing unit 32, and transfers (relays) the received content data to the terminal 10A and the terminal 10B by the transmission/reception unit (transfer unit) 31 (step S1622).

For example, in the above-described session ID "se1", image data sent to the terminal 10A corresponding to the terminal ID "01aa" are converted to 30 fps and HD, sound data are converted to 44.1 kHz, and the data are transferred to the terminal 10A (step S1623). Moreover, image data sent to the terminal 10B corresponding to the terminal ID "01ba" are converted to 20 fps and HD, sound data are converted to 44.1 kHz, and the data are transferred to the terminal 10B (step S1624).

Meanwhile, the processes of steps S1610 to S1624 are arranged serially in order to make the explanation simple. However, these processes are actually performed in parallel.

As described above, the terminal 10 according to the first embodiment sends control information (start instruction information or start response information) of a session, which includes a service ID for identifying service content provided to the terminal 10, to the management apparatus 50 for managing the session.

Moreover, the management apparatus 50 determines service content of the session, for example, based on the service ID included in the control information received from the terminals 10 participating in the session. Moreover, the management apparatus 50 reports information specifying quality of content data sent by the respective terminals 10 participating in the session based on the determined service content of the session to the respective terminals 10 participating in the session.

The respective terminals 10 participating in the session send content data with the quality of content data to be sent reported from the management apparatus 50.

Therefore, according to the transmission system 1 of the first embodiment, in a session among transmission terminals 10, quality of content data, which the respective terminals 10 send, can be easily controlled, depending on the session (service content of session).

In the related art as disclosed in Japanese Unexamined Patent Application Publication No. 2008-227577, in a session, in which data transmission is carried out among the transmission terminals, it is quite difficult to control quality of content data that each of the transmission terminals 10 participating in the session sends depending on the session.

According to the first embodiment, a transmission management apparatus that make is easier to control quality of content data that each of the transmission terminals 10 sends in a session among the transmission terminals 10 depending on the session can be provided.

Second Embodiment

In the first embodiment, the example where the management apparatus 50 determines service content of session based on respective service IDs of the terminals 10 participating in the session is described. In a second embodiment, an example wherein the management apparatus 50 determines service content of a session based on respective service IDs of the terminals 10 participating in the session and terminal performances will be described.

<Functional Configuration>

Figure 17:
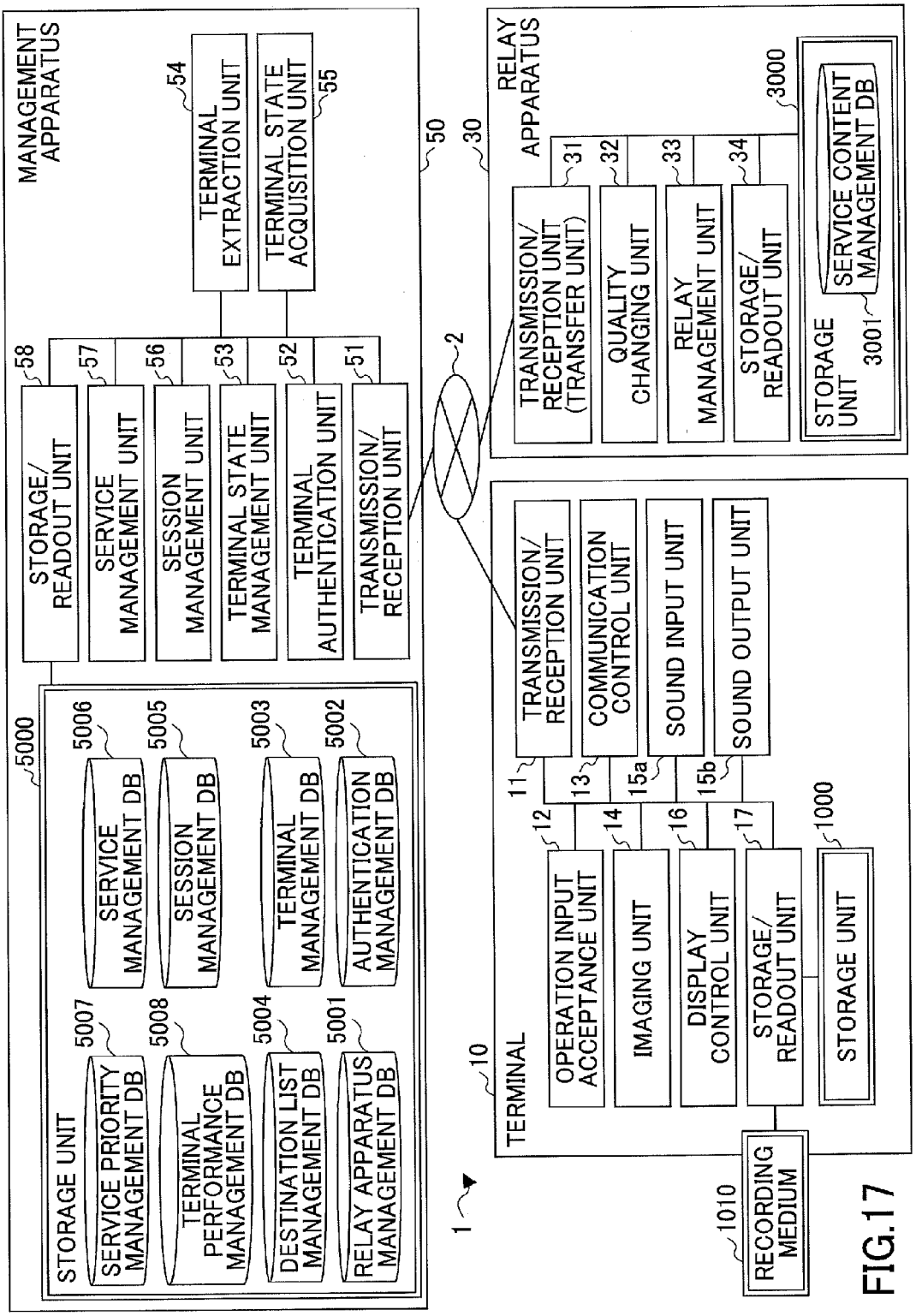
FIG. 17 is a functional configuration diagram illustrating an example of a transmission system according to a second embodiment.

FIG. 17 is a functional configuration diagram illustrating a transmission system according to the second embodiment. The management apparatus 50 according to the second embodiment is obtained by adding a service priority management DB 5007 and a terminal performance management DB 5008 in the storage unit 5000 to the functional configuration according to the first embodiment as shown in FIG. 7. Moreover, in the second embodiment, it is assumed that communication quality included in service content corresponding to each of the service IDs managed in the service management DB 5006 can include a plurality of options.

Moreover, in the second embodiment, the service management unit 57 of the management apparatus 50 is assumed to manage the service priority management DB 5007 and the terminal performance management DB 5008. Meanwhile, since other elements are the same as the elements in the first embodiment as shown in FIGS. 7 to 9, a difference from the first embodiment will be mainly explained here.

Figure 18:
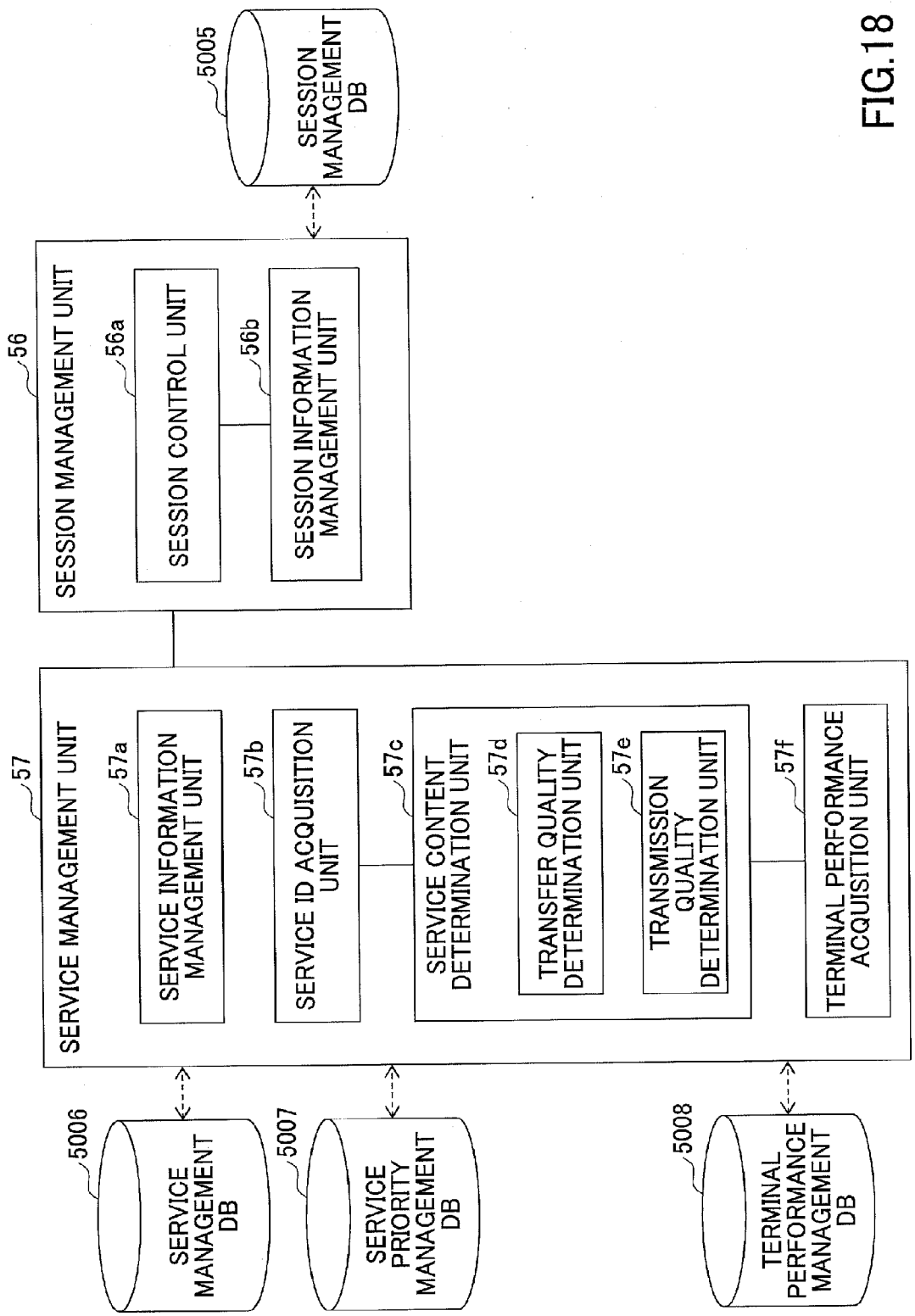
FIG. 18 is a configuration diagram illustrating an example of a service management unit and a session management unit according to the second embodiment.

FIG. 18 is a functional configuration diagram of the service management unit and a session management unit according to the second embodiment. The service management unit 57 according to the second embodiment is provided with a terminal performance acquisition unit 571 in addition to the configuration of the service management unit 57 according to the first embodiment as shown in FIG. 8. Meanwhile, since the other elements are the same as the elements of the first embodiment as shown in FIG. 8, a difference from the first embodiment will be mainly explained here.

The terminal performance acquisition unit 571 acquires information indicating terminal performance of each of the terminals 10 participating in the session. For example, the terminal performance acquisition unit 571 acquires, from the session control unit 56a, control information, such as start request information or start response information, received from the respective terminals 10 participating in the session, and extracts information indicating terminal performance included in the acquired control information. Moreover, the terminal performance acquisition unit 571 stores the extracted information indicating terminal performance of each of the terminals 10 participating in the session, for example, in the terminal performance management DB 5008.

Moreover, as another example, the terminal performance acquisition unit 571 acquires, from the session control unit 56a, a message, such as the start request information or the start response information, received from the respective terminals 10 participating in the session, and extracts a terminal ID included in the acquired information. Furthermore, the terminal performance acquisition unit 571 may acquire terminal performance corresponding to the acquired terminal ID from the terminal performance management DB 5008 or the like, which stores preliminarily a terminal ID and terminal performance of a terminal 10 corresponding to the terminal ID, in association with each other.

Here, the terminal performance management DB 5008 will be described.

(Terminal Performance Management DB)

FIG. 19 is a conceptual diagram of a terminal performance management table according to the second embodiment. The terminal performance management DB 5008 stored in the storage unit 5000 of the management apparatus 50 includes, for example, the terminal performance management table 1901 as shown in FIG. 19. In the terminal performance management table 1901, a terminal ID, with identification information identifying the terminal 10, and terminal performance information indicating terminal performance of the terminal 10 are managed in association with each other.

Meanwhile, the information indicating terminal performance of the terminal 10 includes, for example, information indicating quality of content data that the terminal 10 can send, information indicating quality of content data the terminal 10 can receive, or the like. For example, in the example shown in FIG. 19, terminal performance on the reception side of the terminal 10 of the terminal ID "01aa"

is that image data with reception frame rate of "20 fps" or "10 fps" and reception image quality of "SD" can be received, and that reception of sound data is "allowed". Moreover, terminal performance on the transmission side of the terminal 10 of the terminal ID "01aa" is that image data with transmission frame rate of "40 fps" or "20 fps" and transmission image quality of "HD" can be sent, and that transmission of sound data is "not allowed".

The terminal performance acquisition unit 571 of the management apparatus 50 may acquire information indicating terminal performance included in the start request information, the start response information or the like received from the terminal 10 participating in the session, and store the acquired terminal performance in the terminal performance management table.

Alternatively, the management apparatus 50 may preliminarily store, for example, the terminal performance management table 1901 in the terminal performance management DB 5008. In this case, the terminal performance acquisition unit 571 can acquire terminal performance from the terminal performance management table 1901 by using a terminal ID included in the start request information, the start response information or the like received from the terminal 10 participating in the session.

Next, the service priority management DB 5007 will be explained.

(Service Priority Management DB)

The service priority management DB 5007 stored in the storage unit 5000 of the management apparatus 50 includes, for example, a service priority management table 2001 as shown in FIG. 20. In the service priority management table 2001, information related to selection method (priority or the like) for each item of communication quality is stored in association with respective service IDs. In the example shown in FIG. 20, the service ID "sv901" indicates that in a case where there are options of the transmission frame rate, a greater frame rate is preferentially selected. Moreover, the service ID "sv902" indicates that in a case where there are options of the transmission frame rate, a smaller frame rate is preferentially selected. For the other quality items, similar selection methods are stored.

In a case where there are a plurality of service contents of sessions which are selectable, the service content determination unit 57c of the management apparatus 50, for example, using the service priority management table 2001, narrows down to service contents of one session.

Subsequently, the service management DB 5006 according to the second embodiment will be described.

(Service Management DB)

The service management DB 5006 stored in the storage unit 5000 of the management apparatus 50 according to the second embodiment includes, for example, a service management table 2101 shown in FIG. 21. The service management table 2101 stores information for managing service IDs and service content for each of the service IDs, in association with each other. In the example shown in FIG. 21, as service content, reception quality items indicating reception quality of content data and the quality thereof are stored.

Meanwhile, in the service management table 1103 according to the first embodiment shown in FIG. 11C, for example, one quality value is set for each reception quality item, such as "reception frame rate", "reception image quality", "reception sampling rate" or the like. In contrast, in the service management table 2101 according to the second embodiment, one or more options can be included for each reception quality item.

For example, FIG. 21 shows that for the service ID of "sv901", as a frame rate of the reception quality item, the frame rates 30 fps and 20 fps can be dealt with. Similarly, FIG. 21 shows that for the service ID "sv901", as an image quality of the reception quality item, the image qualities "HD" and "SD" can be dealt with.

<Flow of Process>

(Process of Communication Session)

Figure 22:
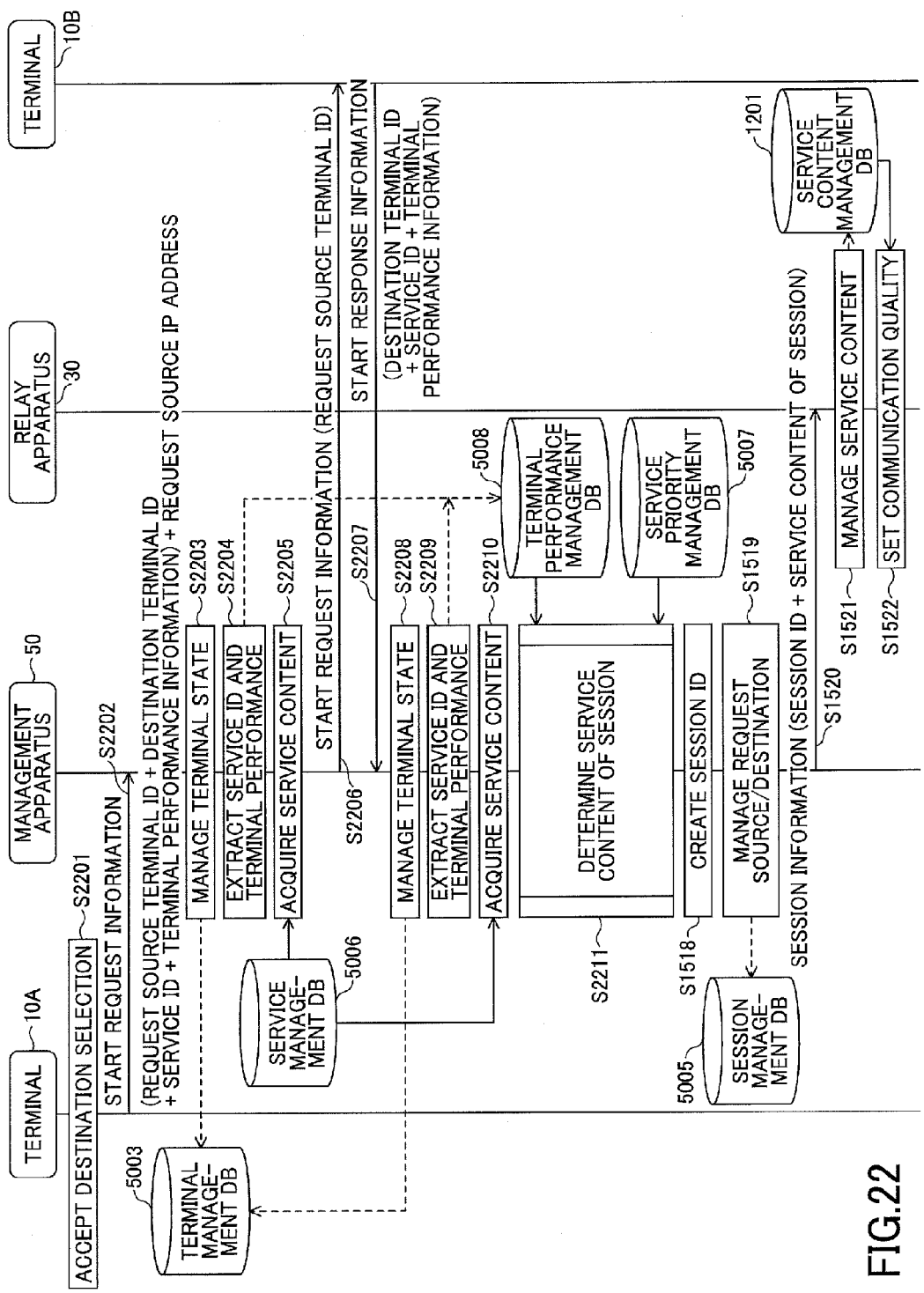
FIG. 22 is a sequence diagram illustrating an example of an operation of a communication session in the transmission system according to the second embodiment.

FIG. 22 is a sequence diagram illustrating an example of a process of a communication session in a transmission system according to the second embodiment. Meanwhile, FIG. 22 illustrates an example processes in a case of a single destination terminal in order to make the explanation simple. However, a number of destination terminals may be two or more. Moreover, processes of and after step S1518 in FIG. 22 are the same as the processes of the communication session according to the first embodiment explained with reference to FIGS. 15 and 16, and mainly a difference from the first embodiment will be explained.

In a case where the terminal 10A accepts an operation of selecting a destination terminal (terminal 10B) by a user of the terminal 10A (step S2201), the terminal 10A sends start request information for requiring the management apparatus 50 to start a session (step S2202). This start request information includes, for example, request source a terminal ID of the terminal 10A, a destination terminal ID of the terminal 10B, a service ID of the terminal 10A and terminal performance information indicating terminal performance of the terminal 10. Moreover, the start request information also includes, for example, an IP address of the terminal 10A (request source IP address) or the like.

The terminal state management unit 53 of the management apparatus 50, which receives the start request information from the terminal 10A, based on the terminal ID "01aa" of the request source terminal (terminal 10A) included in the start request information, updates the terminal management table 1003 (step S2203). For example, the terminal state management unit 53 changes information of operating state corresponding to the terminal ID "01aa" of the terminal 10A to "online (communicating)", and updates information of reception date/time.

The service ID acquisition unit 57b of the management apparatus 50 extracts service ID included in the start request information received from the terminal 10A (step S2204). Furthermore, in the second embodiment, the terminal performance acquisition unit 57f of the management apparatus 50 acquires terminal performance information that is information indicating terminal performance of the terminal 10A included in the start request information received from the terminal 10A. The information indicating the terminal performance of the terminal 10A acquired by the terminal performance acquisition unit 57f is stored, for example, in the terminal performance management DB 5008.

The service information management unit 57a of the management apparatus 50 acquires, from the service management DB 5006, service content corresponding to the service ID of the terminal 10A acquired by the service ID acquisition unit 57a (step S2205). For example, the service information management unit 57a acquires, from the service management table 2101 shown in FIG. 21, quality (reception frame rate, reception image quality, reception sampling rate and the like) of the content data corresponding to the service ID of the terminal 10A. Meanwhile, in the second embodiment, as described above, each quality item of content data can include one or more options.

The session control unit 56a of the management apparatus 50 sends start request information for requiring the terminal 10B that is the destination terminal to start the session (step S2206). The start request information includes, for example, the request source terminal ID of the terminal 10A that is the request source terminal.

The terminal 10B which receives the start request information from the management apparatus 50, sends start response information to the management apparatus 50 (step S2207). The start response information includes, for example, the destination terminal ID of the terminal 10B, a service ID, and terminal performance information of the terminal 10B.

The terminal state management unit 53 of the management apparatus 50, which receives the start response information from the terminal 10B, based on the terminal ID "01ba" of the terminal 10B included in the start response information, updates the terminal management table 1003 (step S2208). For example, the terminal state management unit 53 changes information of operating state corresponding to the terminal ID "01ba" of the terminal 10B to "online (communicating)", and updates information of reception date/time.

The service ID acquisition unit 57b of the management apparatus 50 extracts (acquires) service ID included in the start response information received from the terminal 10B (step S2209). Furthermore, in the second embodiment, the terminal performance acquisition unit 57f of the management apparatus 50 extracts (acquires) terminal performance information of the terminal 10B included in the start request information received from the terminal 10B. The terminal performance information of the terminal 10B acquired by the terminal performance acquisition unit 57f is stored, for example, in the terminal performance management DB 5008.

The service information management unit 57a of the management apparatus 50 acquires, from the service management DB 5006, service content corresponding to the service ID of the terminal 10B acquired by the service ID acquisition unit 57a (step S2210). For example, the service information management unit 57a acquires, from the service management table 2101 shown in FIG. 21, quality of content data corresponding to the service ID of the terminal 10B.

The service content determination unit 57c of the management apparatus 50 determines service content of the session based on the service contents of the terminals 10A and 10B participating in the session and terminal performance information of the terminals 10A and 10B (step S2211). At this time, in a case where there are a plurality of selectable service contents of session, the service content determination unit 57c, based on the service priority management table 2001, determines one service content of session from the selectable service contents of session. Meanwhile, specific process of determining service content of session will be described later with reference to FIG. 23.

Processes of and after step S1518 in FIG. 22 may be the same as in the first embodiment, described with reference FIGS. 15 and 16.

Next, the process of determining service content of session will be described.

(Process of Determining Service Content of Session)

Figure 23:
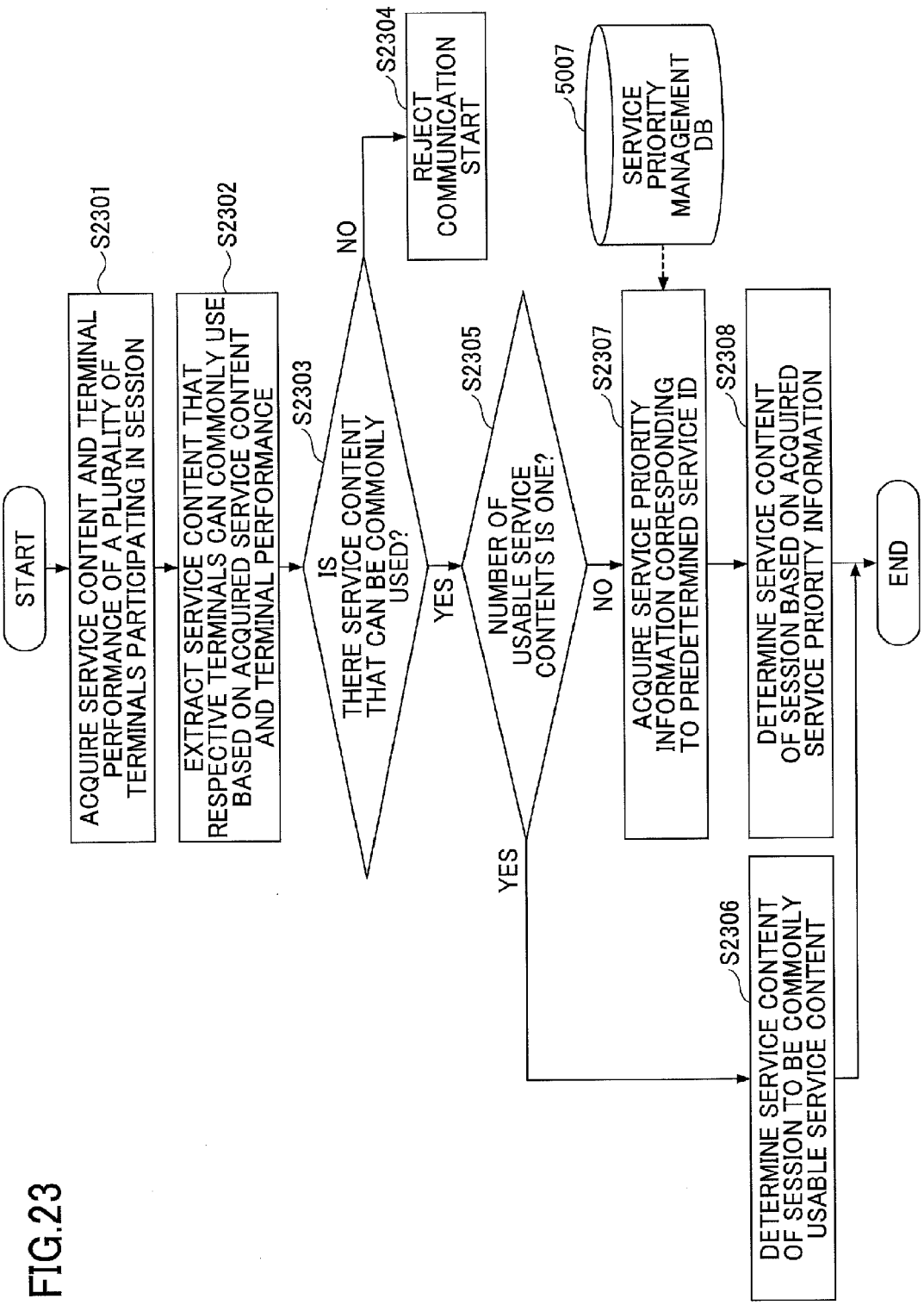
FIG. 23 is a flowchart illustrating an example of an operation of determining a service content of a session according to the second embodiment.

FIG. 23 is a flowchart illustrating an example of a process of determining service content of a session according to the second embodiment.

The management apparatus 50 acquires service content and terminal performance of each of the terminals 10 participating in the session (step S2301). This process corresponds, for example, to the processes of steps S2202 to S2210 in FIG. 22.

The service content determination unit 57c of the management apparatus 50 determines service content that can be commonly used by the respective terminals 10 participating in the session based on the service content and the terminal performance of each of the terminals 10 participating in the session (step S2302).

For example, the service content determination unit 57c obtains transmission quality (quality of content data to be transmitted) and reception quality (quality of content data to be received) that satisfy the following formulas (1) to (4).

For example, assume that the terminals 10 participating in the session are a terminal 10A, a terminal 10B and a terminal 10C. Moreover, the transmission qualities and reception qualities for the terminals 10A, 10B and 10C are assumed to be $S_A$, $S_B$ and $S_C$, and $R_A$, $R_B$ and $R_C$, respectively.

Moreover, discrete sets indicating quality of receivable content data based on service IDs of the respective terminals 10A, 10B and 10C are assumed to be $C_{rSA}$, $C_{rSB}$ and $C_{rSC}$. One element in each of the above-described discrete sets corresponds to, for example, one line of the service management table 2101 as shown in FIG. 21.

Furthermore, discrete sets indicating quality of content data, each of which can send the terminal performance on a transmission side of the respective terminals 10A, 10B and 10C are assumed to be $C_{sDA}$, $C_{sDB}$ and $C_{sDC}$. Moreover, discrete sets indicating quality of content data, each of which can receive the terminal performance on a reception side of the respective terminals 10A, 10B and 10C are assumed to be $C_{rDA}$, $C_{rDB}$ and $C_{rDC}$. One element in each of the above-described discrete sets corresponds to, for example, one line of the terminal performance management table 1901 as shown in FIG. 19.

Here, the transmission qualities $S_A$, $S_B$ and $S_C$ of the respective terminals 10A, 10B and 10C used in the session are assumed to be elements of the discrete sets $C_{sDA}$, $C_{sDB}$ and $C_{sDC}$, respectively. This is expressed by the following formula (1).

[Formula 1]

$$s_A \in C_{sDA}$$

$$s_B \in C_{sDB}$$

$$s_C \in C_{sDC} \quad (1)$$

Moreover, the reception quality $R_A$, $R_B$ and $R_C$ of the respective terminals 10A, 10B and 10C used in the session are assumed to be elements of the discrete sets $C_{rSA}$, $C_{rSB}$ and $C_{rSC}$, respectively, and also assumed to be elements of the discrete sets $C_{rDA}$, $C_{rDB}$ and $C_{rDC}$, respectively, This is expressed by the following formula (2).

[Formula 2]

$$r_A \in C_{rSA} \cap C_{rDA}$$

$$r_B \in C_{rSB} \cap C_{rDB}$$

$$r_C \in C_{rSC} \cap C_{rDC} \quad (2)$$

Furthermore, each of the transmission qualities $S_A$, $S_B$ and $S_C$ of the respective terminals 10A, 10B and 10C used in the session is assumed to have quality greater than or equal to the greatest reception quality of the reception qualities of counterpart terminals performing the session. This is expressed by the following formula (3).

[Formula 3]

$$s_A \geq \max(r_B, r_C)$$

$$s_B \geq \max(r_C, r_A)$$

$$s_C \geq \max(r_A, r_B) \quad (3)$$

Furthermore, each of the reception qualities $R_A$, $R_D$ and $R_C$ of the respective terminals 10A, 10B and 10C used in the session is assumed to have quality less than or equal to the smallest transmission quality of the transmission qualities of counterpart terminals performing the session. This is expressed by the following formula (4).

[Formula 4]

$$r_A \leq \min(s_B, s_C)$$

$$r_B \leq \min(s_C, s_A)$$

$$r_C \leq \min(s_A, s_B) \quad (4)$$

The service content determination unit 57c of the management apparatus 50 extracts $S_A$, $S_B$, $S_C$, $R_A$, $R_R$ and $R_C$ that satisfy the above-described formulas (1) to (4), as service content which terminals 10 participating in the session can commonly use (step S2302 in FIG. 23).

The service content determination unit 57c determines whether there is service content that can be commonly used by the respective terminals 10 participating in the session (step S2303 in FIG. 23). Here, in a case where there is not the service content that can be commonly used (step S2303: NO), the service content determination unit 57c rejects starting communication (step S2304). In contrast, in a case where there is the service content that can be commonly used (step S2303: YES), the service content determination unit 57c causes the process to proceed to step S2305.

The service content determination unit 57c determines whether a number of service contents extracted at step S2302 that the respective terminals 10 can commonly use is one (step S2305). Here, in a case where there is one service content that can be commonly used (step S2305: YES), the service content determination unit 57c determines the service content (transmission quality and reception quality) extracted at step S2302 to be the service content of the session (step S2106). In contrast, in a case where there are more than one commonly usable service contents (step S2305: NO), the process of the service content determination unit 57c proceeds to step S2307.

The service content determination unit 57c of the management apparatus 50 acquires service priority information corresponding to a prescribed service ID from the service priority management DB 5007 (step S2307). Here, the prescribed service ID may be, for example, a predetermined service ID, such as a service ID of the terminal 10A that is the request source of the session or a service ID of the terminal 10B of the destination.

Here, an example in which the prescribed service ID is the service ID of the request source terminal 10A for the session will be illustrated.

The service content determination unit 57c of the management apparatus 50 determines a service content based on the acquired service priority information, e.g. service priority information corresponding to the service ID of the terminal 10A that is the request source terminal 10 (step S2308).

For example, assume that the service ID of the terminal 10A is "sv901" and there are options for the transmission frame rate in the service content of the session. In this case, the service content determination unit 57c determines a greater frame rate to be the transmission frame rate using, for example, the service priority management table 2001 shown in FIG. 20.

Similarly, in a case where options of the reception image quality of the service content of the session are "HD" and "SD", the service content determination unit 57c determines "HD" having a greater number of pixels to be the reception image quality using, for example, the service priority management table 2001 shown in FIG. 20.

According to the above-described processes, the service content determination unit 57c extracts the service content that the respective terminals 10 can commonly use, based on the service content and terminal performance of the terminals 10 participating in the session. Moreover, in a case where there are a plurality of service contents that the respective terminals 10 can commonly use, the service content determination unit 57c can determine one service content from the commonly usable service contents by using the service priority management DB 5007.

Meanwhile, the above-described description of the embodiment is only an example. For example, at step S2302 in FIG. 23, the case where the number of the terminals 10 is three is described. However, also in a case where the number of the terminals 10 is other than three, the service content of the session can be determined in the same way as the above-described case. Moreover, at step S2307 in FIG. 23, the case where the prescribed service ID is the service ID of the request source terminal is described. However, the same process can be performed using service ID of one of the other terminals 10 participating in the session as the prescribed service ID.

<Summary>

A transmission management apparatus (50) in one embodiment manages a session sending/receiving content data via a relay apparatus (30). The transmission management apparatus (50) includes a service information management unit (57a) for managing service management information (5006) that preliminary stores service identification information for identifying service content provided to each of a plurality of transmission terminals (10), and service content corresponding to the service identification information; a service identification information acquisition unit (57b) for acquiring the service identification information of each of the transmission terminals (10) participating in the session; a service content determination unit (57c) for determining service content of the session, based on the acquired service identification information and the service management information; and a session control unit (56a) for reporting information specifying quality of the content data to be sent based on the determined service content of the session to each of the transmission terminals (10) participating in the session.

According to the above-described configuration, in the session among the transmission terminals (10), the transmission management apparatus (50) can easily control the quality of the content data sent by each of the transmission terminals (10) participating on the session.

Preferably, the transmission terminal (10) includes a transmission quality changing unit (18) for changing quality of the content data sent to the relay apparatus (30) based on the information specifying quality of the content data to be sent received from the transmission management apparatus (50).

According to the above-described configuration, the transmission terminal (10) can send content data with a variety of qualities specified by the transmission management apparatus (50).

Preferably, the transmission terminal (10) includes a readout unit (17) for reading out service identification information from a recording medium (1010) that stores the service identification information for identifying service content to be provided to the transmission terminal (10); and a communication control unit (13) for sending control information for the session including the readout service identification information and terminal performance information on the own terminal to the transmission management apparatus.

Preferably, the transmission management apparatus (50) further manages terminal performance management information (5008) preliminarily storing terminal identification information of the transfer terminals (10), and terminal performance information regarding quality of content data corresponding to the terminal identification information, the service content determination unit (57c) determines service content of the session based on the service identification information and the terminal identification information of each of the transmission terminals (10) participating in the session, the service management information (5006) and the terminal performance management information (5008).

According to the above-described configuration, the transmission management apparatus (50) can determine the service content of the session based on the service identification information and the terminal performance of each of the transmission terminals (10) participating in the session.

Meanwhile, the above-described reference numerals in the parentheses are added in order to understand easily, are only examples, and do not restrict the scope of the present invention.

Supplement to Embodiment

The relay apparatus 30, the management apparatus 50 or the like in the embodiment may be configured with a single computer, or may be configured with several computers by dividing the respective units (functions or means) and allocating them arbitrarily to the computers.

Moreover, in FIGS. 10A to 11C, reception date/time is managed. However, this is not limiting, i.e. only reception time of the reception date/time has to be managed.

Furthermore, in the embodiment, a case of a video conference terminal is described as an example of the transmission terminal. This is not limiting. A telephone system of an IP (Internet Protocol) telephone, an internet telephone or the like may be employed. Moreover, a smartphone, a mobile telephone, a car navigation terminal, a wearable computer, a monitoring camera, an electronic whiteboard, a projector, a gaming machine, or industrial equipment having a communication function may be used. The wearable computer includes a wristwatch, a head mounted display or the like. Moreover, the industrial equipment includes office equipment such as a MFP (Multifunctional Peripheral/Printer/Product) or the like, medical equipment such as an endoscopic instrument, agricultural equipment such as a cultivator, or the like.

Moreover, in the embodiment, as an example of content data, image data and sound data are described. However, this is not limiting. Touch data may be employed. In this case, a sense of touch by a user on one terminal is transmitted to the other terminal. Furthermore, content data may be smell data. In this case, smell on one terminal is transmitted to the other terminals. Moreover, content data have only to be at least one of image data, sound data, touch data and smell data.

Further, the present invention is not limited to these embodiments, but various variations and modifications may be made without departing from the scope of the present invention.

What is claimed is:

1. A transmission management apparatus for managing a session performing transmission/reception of content data via a relay apparatus by a first transmission terminal a second transmission terminal and a third transmission terminal, the transmission management apparatus comprising:
    service information management processing circuitry configured to manage service management information in which service identification information identifying service content provided to each of a plurality of transmission terminals, and service content corresponding to the service identification information are stored preliminarily;
    service identification information acquisition processing circuitry configured to acquire service identification information from each of the first transmission terminal, the second transmission terminal, and the third transmission terminal participating in the session;
    transfer quality determination processing circuitry configured to determine a transfer quality of content data that the relay apparatus transfers to each of the transmission terminals participating in the session, based on the service identification information acquired by the service identification information acquisition processing circuitry and the service management information; and
    session control processing circuitry configured to send information specifying a quality of the content data to be sent, based on the service content of the session determined by the transfer quality determination processing circuitry, to each of the first transmission terminal, the second transmission terminal, and the third transmission terminal participating in the session,
    wherein the session control processing circuitry sends session information including information specifying a quality of the content data that the relay apparatus transfers to each of the transmission terminals participating in the session, to the relay apparatus, based on the determined service content of the session, and
    wherein the relay apparatus converts content data received from the first transmission terminal, in response to the quality of the content data to be transferred to each of the transmission terminals participating in the session included in the session information, and sends the content data converted into the quality of the content data to the second transmission terminal and the third transmission terminal, respectively.

2. The transmission management apparatus according to claim 1,
    wherein the quality of the content data includes a quality item of a frame rate, a bit rate, resolution, image quality or a color depth of image data.

3. The transmission management apparatus according to claim 1,
    wherein the quality of the content data includes a quality item of a sampling rate, a bit rate or a quantization bit number of sound data.

4. A transmission system including the transmission management apparatus according to claim 1, the relay apparatus, and the plurality of transmission terminals participating in a session performing transmission/reception of the content data via the relay apparatus,
   wherein the transmission terminal includes:
     a transmission quality changing processing circuitry configured to change the quality of the content data sent to the relay apparatus, based on the information specifying the quality of the content data to be sent received from the transmission management apparatus.
5. The transmission system according to claim 4,
   wherein the transmission terminal includes:
   readout processing circuitry configured to read out
   the service identification information identifying the service content provided to the transmission terminal, from a recording medium that stores the service identification information; and
   communication control processing circuitry configured to send control information of the session including the service identification information readout by the readout processing circuitry and terminal identification information of the transmission terminal to the transmission management apparatus.
6. The transmission system according to claim 4,
   wherein the transmission management apparatus is configured to manage terminal performance management information, in which terminal identification information of the plurality of transmission terminals, and terminal performance information regarding quality of the content data corresponding to the terminal identification information are preliminarily stored,
   wherein the transfer quality determination processing circuitry is configured to determine the transfer quality, based on the service identification information and the terminal identification information of each of the transmission terminals participating in the session, the service management information, and the terminal performance management information.
7. The transmission system according to claim 4,
   wherein the relay apparatus includes:
   service content management processing circuitry configured to acquire and manage the session information received from the transmission management apparatus;
   transfer processing circuitry configured to transfer the content data sent/received among the plurality of transmission terminals in the session; and
   quality changing processing circuitry configured to change quality of the content data transferred by the transfer processing circuitry, based on the session information managed by the service content management processing circuitry.
8. A non-transitory computer-readable recording medium storing a program for causing a computer to execute a process of managing a session performing transmission/reception of content data via a relay apparatus by a first transmission terminal, a second transmission terminal, and a third transmission terminal, comprising:
   managing service management information in which service identification information identifying service content provided to each of a plurality of transmission terminals, and service content corresponding to the service identification information are preliminarily stored;
   acquiring service identification information from each of the first transmission terminal, the second transmission terminal, and the third transmission terminal participating in the session;
   determining a transfer quality of content data that the relay apparatus transfers to each of the transmission terminals participating in the session, based on the acquired service identification information and the service management information; and
   sending information specifying a quality of the content data to be sent, based on the determined service content or the session, to each of the first transmission terminal, the second transmission terminal, and the third transmission terminal participating in the session,
   wherein the sending sends session information including information specifying a quality of the content data that the relay apparatus transfers to each of the transmission terminals participating in the session, to the relay apparatus, based on the determined service content of the session, and
   wherein the relay apparatus converts content data received from the first transmission terminal, in response to the quality of the content data to be transferred to each of the transmission terminals participating in the session included in the session information, and sends the content data converted into the quality of the content data to the second transmission terminal and the third transmission terminal, respectively.
9. A transmission management method for managing a session performing transmission/reception of content data via a relay apparatus by a transmission management apparatus, the transmission management apparatus managing service management information in which service identification information identifying service content provided to each of a first transmission terminal, a second transmission terminal, and a third transmission terminal, and service content corresponding to the service identification information are stored preliminarily, the method comprising:
   acquiring service identification information from each of the first transmission terminal, the second transmission terminal, and the third transmission terminal participating in the session;
   determining a transfer quality of content data that the relay apparatus transfers to each of the transmission terminals participating in the session, based on the acquired service identification information and the service management information; and
   sending information specifying a quality of the content data to be sent, based on the determined service content of the session, to each of the first transmission terminal, the second transmission terminal, and the third transmission terminal participating in the session,
   wherein the sending sends session information including information specifying a quality of the content data that the relay apparatus transfers to each of the transmission terminals participating in the session, to the relay apparatus, based on the determined service content of the session, and
   wherein the relay apparatus converts content data received from the first transmission terminal, in response to the quality of the content data to be transferred to each of the transmission terminals participating in the session included in the session information, and sends the content data converted into the quality of the content data to the second transmission terminal and the third transmission terminal, respectively.
10. The transmission apparatus according to claim 1, wherein:

the transfer quality determination processing circuitry is configured to determine a transfer quality of the first transmission terminal for the content data to be a higher quality than transfer qualities of the content data for the second transmission terminal and the third transmission terminal.

11. The non-transitory computer-readable recording medium according to claim 8, wherein:
the determining of the transfer quality of content data determines a transfer quality of the first transmission terminal for the content data to be a higher transfer quality than transfer qualities of the content data for the second transmission terminal and the third transmission terminal.

12. The transmission management method according to claim 9, wherein:
the determining of the transfer quality of content data determines a transfer quality of the first transmission terminal for the content data to be a higher transfer quality than transfer qualities of the content data for the second transmission terminal and the third transmission terminal.

\* \* \* \* \*